United States Patent
Saka

(10) Patent No.: US 9,986,114 B2
(45) Date of Patent: May 29, 2018

(54) IMAGE FORMING SYSTEM TRANSMITTING SETTING INFORMATION, IMAGE FORMING APPARATUS, AND RECORDING MEDIUM

(71) Applicant: KONICA MINOLTA, INC., Chiyoda-ku, Tokyo (JP)

(72) Inventor: Masaaki Saka, Toyohashi (JP)

(73) Assignee: KONICA MINOLTA, INC., Chiyoda-Ku, Tokyo (JP)

(*) Notice: Subject to any disclaimer, the term of this patent is extended or adjusted under 35 U.S.C. 154(b) by 0 days. days.

(21) Appl. No.: 15/081,140

(22) Filed: Mar. 25, 2016

(65) Prior Publication Data

US 2016/0286061 A1 Sep. 29, 2016

(30) Foreign Application Priority Data

Mar. 26, 2015 (JP) ................. 2015-065027

(51) Int. Cl.
*H04N 1/00* (2006.01)

(52) U.S. Cl.
CPC ..... *H04N 1/00501* (2013.01); *H04N 1/00307* (2013.01); *H04N 1/00411* (2013.01); *H04N 1/00517* (2013.01); *H04N 1/00973* (2013.01); *H04N 2201/0031* (2013.01); *H04N 2201/0032* (2013.01); *H04N 2201/0075* (2013.01); *H04N 2201/0094* (2013.01)

(58) Field of Classification Search
None
See application file for complete search history.

(56) References Cited

U.S. PATENT DOCUMENTS

| | | | | |
|---|---|---|---|---|
| 2003/0216146 A1* | 11/2003 | Otsuka | ............... | H04M 1/72502 455/462 |
| 2009/0238213 A1* | 9/2009 | Kasatani | ............ | H04N 1/00344 370/503 |
| 2011/0320952 A1* | 12/2011 | Kataoka | .............. | H04L 41/0253 715/735 |

(Continued)

FOREIGN PATENT DOCUMENTS

JP  2013-150273 A  8/2013

*Primary Examiner* — Miya J Williams
(74) *Attorney, Agent, or Firm* — Buchanan Ingersoll & Rooney PC

(57) ABSTRACT

An image forming system includes multiple image forming apparatuses and a mobile terminal. The mobile terminal establishes communication connection in a remote operation mode with a parent apparatus (one of the image forming apparatuses), the remote operation mode being a mode in which the mobile terminal operates as a remote operation apparatus of the parent apparatus. The mobile terminal displays an operation screen received from the parent apparatus, accepts a user operation provided through the operation screen, and transmits first setting information based on the user operation to the parent apparatus. The parent apparatus receives the first setting information from the mobile terminal and determines a setting target child apparatus. The parent apparatus transmits second setting information based on the first setting information to the setting target child apparatus, and the setting target child apparatus sets setting content based on the second setting information received from the parent apparatus.

20 Claims, 30 Drawing Sheets

(56) References Cited

U.S. PATENT DOCUMENTS

| | | | |
|---|---|---|---|
| 2012/0069381 A1* | 3/2012 | Nagai | G06F 3/122 358/1.14 |
| 2013/0314732 A1* | 11/2013 | Nakabayashi | G06F 3/1204 358/1.13 |
| 2014/0022590 A1* | 1/2014 | Matsuda | G06F 3/1273 358/1.15 |
| 2015/0109638 A1* | 4/2015 | Sasaki | G06F 3/1205 358/1.15 |
| 2017/0048416 A1* | 2/2017 | Cho | G06F 15/16 |

* cited by examiner

| SCREEN ID | SCREEN NAME | TYPE |
|---|---|---|
| 0001 | INITIAL SCREEN | INITIAL SCREEN |
| 1011 | SOFTWARE DIP SWITCH (PRINTER) | COMMON SETTING SCREEN |
| 1012 | SOFTWARE DIP SWITCH (SCANNER) | COMMON SETTING SCREEN |
| 1013 | SOFTWARE DIP SWITCH (ADF) | COMMON SETTING SCREEN |

•
•
•

| 1031 | PRESENCE OR ABSENCE OF FINISHER | COMMON SETTING SCREEN |

•
•
•

| 2011 | IP ADDRESS | INDIVIDUAL SETTING SCREEN |
| 2012 | ... | INDIVIDUAL SETTING SCREEN |

NUMBER 1 | NUMBER 2 | NUMBER 3
<INDIVIDUAL SETTING>
IP ADDRESS
OK

NUMBER 1 | NUMBER 2 | NUMBER 3
<INDIVIDUAL SETTING>
IP ADDRESS
OK

IMAGE FORMING SYSTEM TRANSMITTING SETTING INFORMATION, IMAGE FORMING APPARATUS, AND RECORDING MEDIUM

This application is based on Japanese Patent Application No. 2015-065027 filed on Mar. 26, 2015, the contents of which are hereby incorporated by reference.

BACKGROUND OF INVENTION

Technical Field

The present invention relates to image forming apparatuses such as Multi-Functional Peripheral (MFPs) and techniques related thereto, and in particular, relates to techniques for making settings on image forming apparatuses.

Background Art

Processing for setting various types of setting items of image forming apparatuses is performed by operators such as servicepersons at the time of events such as installation or maintenance of the image forming apparatuses.

For example, a case is conceivable in which a serviceperson inputs settings to various types of setting items while viewing a setting screen that is displayed on an operation panel of a MFP.

There are also techniques for operating MFPs by using a mobile terminal as a remote operation terminal (see Japanese Patent Application Laid-Open No. 2013-150273, for example). With this technique, the same images as the operation screens displayed on display units (e.g., touch panels) of MFPs are displayed on a display unit (e.g., touch panel) of the mobile terminal, and are used to enable remote operation of the MFPs. Such remote operations are executed in a remote operation mode (remote panel mode) of the MFPs.

Incidentally, it is conceivable to use the remote operation technique as described above in the above processing for making settings on the MFPs. In this case, the serviceperson or the like uses operation screens of the MFPs that are displayed sequentially on the mobile terminal, and are thus able to easily perform the setting processing in an interactive manner.

With the above remote operation technique, however, only the operation screen displayed on the touch panel of a specific MFP that is to be remotely operated may be transferred to and displayed on the mobile terminal, and at a certain point in time, a single mobile terminal may be capable of establishing connection with only a single MFP. In other words, the mobile terminal cannot establish connection simultaneously with multiple MFPs.

Thus, in the case of using the above remote operation technique as-is, the mobile terminal needs to repeatedly establish and disconnect connection with multiple MFPs to implement the above setting processing for the MFPs. Such operations are extremely burdensome to the operator.

SUMMARY OF INVENTION

It is an object of the present invention to provide techniques for facilitating processing for making settings on multiple image forming apparatuses while using operation screens of the image forming apparatuses.

In a first aspect of the present invention, an image forming system includes a plurality of image forming apparatuses, and a mobile terminal. The mobile terminal includes a first communication unit that establishes communication connection in a remote operation mode with a parent apparatus that is one of the plurality of image forming apparatuses, the remote operation mode being a mode in which the mobile terminal operates as a remote operation apparatus of the parent apparatus, and an operation unit that, during the communication connection in the remote operation mode, displays an operation screen received from the parent apparatus and accepts a user operation provided to the operation screen. The first communication unit transmits first setting information that is based on the user operation to the parent apparatus. The parent apparatus includes a second communication unit that receives the first setting information from the mobile terminal, and a determination unit that determines a setting target child apparatus from among the plurality of image forming apparatuses, the setting target child apparatus being an apparatus other than the parent apparatus and being a child apparatus on which setting processing is to be performed on the basis of information received from the parent apparatus. The second communication unit transmits second setting information that is based on the first setting information from the parent apparatus to the setting target child apparatus, and the setting target child apparatus sets setting content that is based on the second setting information received from the parent apparatus in the setting target child apparatus.

In a second aspect of the present invention, an image forming apparatus that is one of a plurality of image forming apparatuses constituting an image forming system, includes a communication unit that establishes communication connection in a remote operation mode with a mobile terminal, the remote operation mode being a mode in which the mobile terminal operates as a remote operation apparatus of a parent apparatus that is one of the plurality of image forming apparatuses, and during the communication connection in the remote operation mode, transmits an operation screen to be displayed on the mobile terminal to the mobile terminal and receives first setting information regarding a user operation provided to the operation screen, from the mobile terminal, and a determination unit that determines a setting target child apparatus that is an apparatus other than the parent apparatus among the plurality of image forming apparatuses and that is a child apparatus on which setting processing is to be performed on the basis of information received from the parent apparatus. The communication unit transmits second setting information that is based on the first setting information from the parent apparatus to the setting target child apparatus.

In a third aspect of the present invention, a non-transitory computer-readable recording medium that records a program for causing a computer built into a mobile terminal to execute the steps of a) determining a parent apparatus from among a plurality of image forming apparatuses constituting an image forming system, on the basis of apparatus information regarding plurality of image forming apparatuses, b) establishing communication connection in a remote operation mode between the mobile terminal and the parent apparatus, the remote operation mode being a mode in which the mobile terminal operates as a remote operation apparatus of the parent apparatus, c) during the communication connection in the remote operation mode, displaying an operation screen that is received from the parent apparatus and that is a screen for performing setting processing on the plurality of image forming apparatuses, and accepts a user operation provided to the operation screen, and d) transmitting first setting information that is based on the user operation to the parent apparatus.

These and other objects, features, aspects and advantages of the present invention will become more apparent from the following detailed description of the present invention when taken in conjunction with the accompanying drawings.

BRIEF DESCRIPTION OF DRAWINGS

FIG. 4 illustrates an example of a screen data table.

FIG. 29 illustrates an individual setting screen for Number 1.

FIG. 30 illustrates an individual setting screen for Number 2.

DETAILED DESCRIPTION OF PREFERRED EMBODIMENTS

Hereinafter, embodiments of the present invention will be described with reference to the drawings.

1. First Embodiment 1-1. Overview

Figure 1:
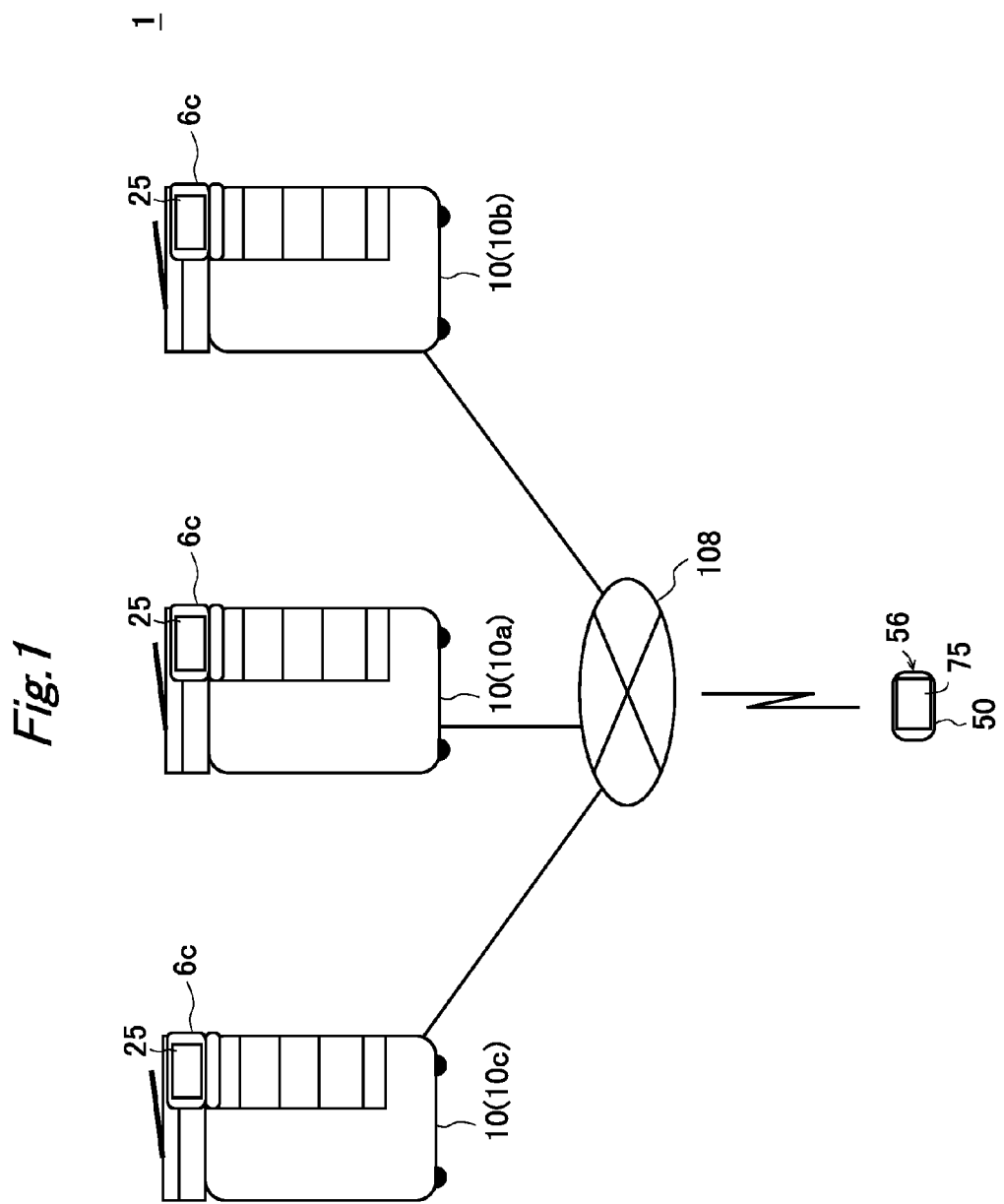
FIG. 1 illustrates an image forming system according to a first embodiment.

FIG. 1 illustrates an image forming system 1 according to a first embodiment of the present invention. As illustrated in FIG. 1, the image forming system 1 includes a mobile terminal 50 and multiple image forming apparatuses 10 (10a, 10b, 10c). Here, a Multi-Functional Peripheral (MFP) is illustrated as an example of the image forming apparatus 10.

The mobile terminal 50 and each MFP 10 may be connected to each other with various types of communication technology. For example, the communication between each MFP 10 and the mobile terminal may be communication with various types of wireless LANs (e.g., IEEE 802.11), or may be short-distance wireless communication. Remote operations performed in a remote operation mode (remote panel mode) by the MFPs 10 mainly use communication with a wireless LAN, as will be described later. Processing for acquiring apparatus information in step S11 uses short-distance wireless communication. The short-distance wireless communication may, for example, be communication based on the near-field communication (NFC) standard and/or the Bluetooth standard.

Communication among the MFPs 10 may be various types of network communication (with a wireless LAN and/or a cable LAN).

1-2. Configuration of Image Forming Apparatus

Figure 2:
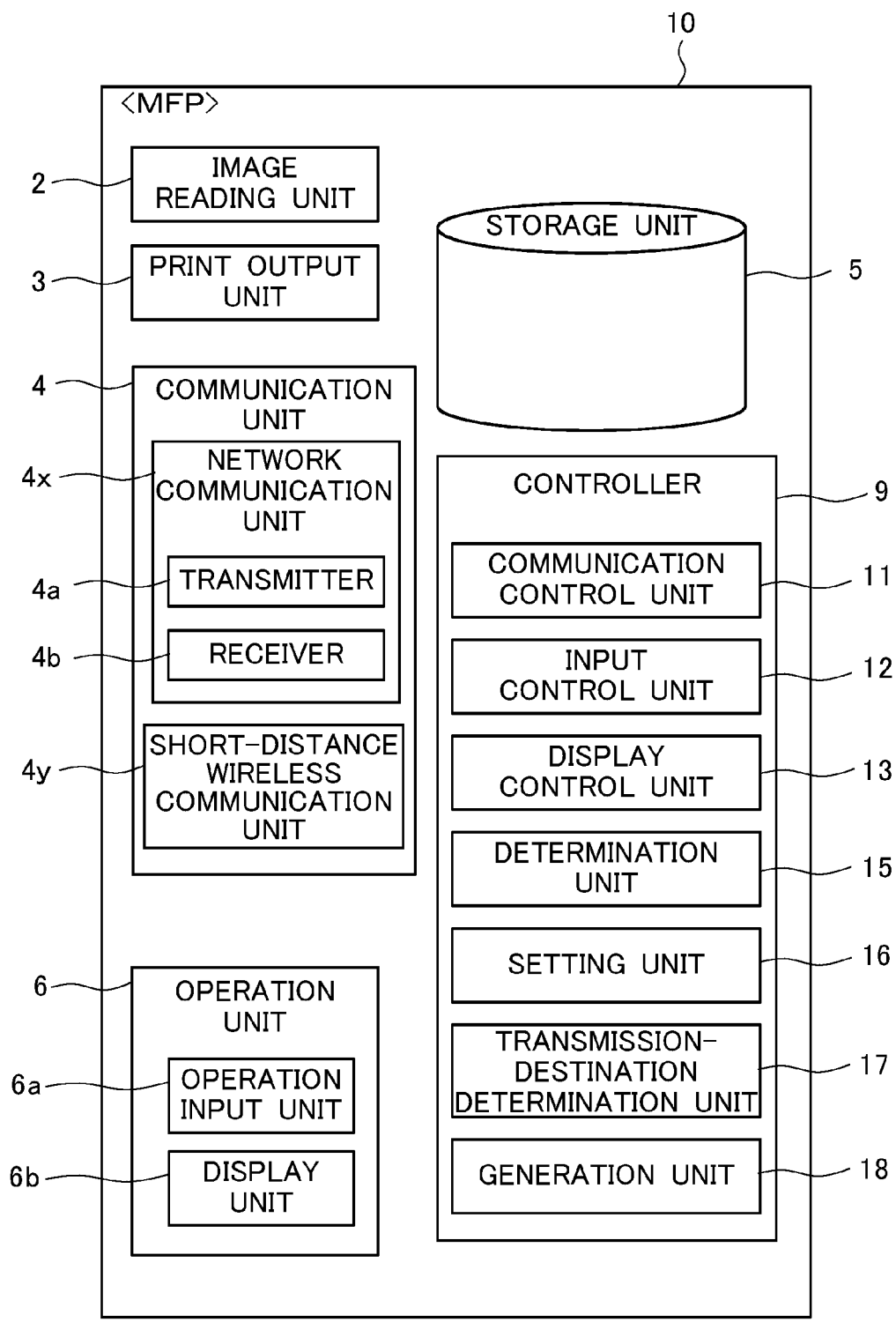
FIG. 2 illustrates functional blocks of an image forming apparatus (MFP).

FIG. 2 illustrates functional blocks of a MFP 10.

The MFP 10 is an apparatus (also, referred to as a "Multi-Functional Peripheral") having functions such as a scan function, a copy function, a facsimile function, and a box storage function. More specifically, the MFP 10 includes, for example, an image reading unit 2, a print output unit 3, a communication unit 4, a storage unit 5, an operation unit 6, and a controller 9 as illustrated in the functional block diagram of FIG. 2, and implements various types of functions by operating these units in combination.

The image reading unit 2 is a processing unit that optically reads (i.e., scans) an original document that is placed at a predetermined position on the MFP 10 and generates image data of the original document (also referred to as an "original image" or a "scanned image"). The image reading unit 2 is also referred to as a "scanning unit."

The print output unit 3 is an output unit that prints out an image on various types of media, such as paper, on the basis of data regarding an object to be printed.

The communication unit 4 is a processing unit capable of facsimile communication via a public network, for example.

The communication unit 4 is also capable of various types of network communication. More specifically, the communication unit 4 includes a network communication unit 4x that provides network communication (e.g., IEEE 802.11). The network communication unit 4x includes a transmitter 4a and a receiver 4b. The network communication unit 4x is capable of wireless communication and wired communication. The communication unit 4 also includes a short-distance wireless communication unit 4y that provides short-distance wireless communication.

The storage unit 5 is configured by a storage device such as a hard disk drive (HDD).

The operation unit 6 includes an operation input unit 6a that accepts operation input to the MFP 10, and a display unit 6b that displays and outputs various types of information.

The MFP 10 is also provided with a generally plate-like operation panel unit 6c (see FIG. 1). The operation panel unit 6c includes a touch panel 25 (see FIG. 1) on the front side. The touch panel 25 not only functions as part of the operation input unit 6a but also functions as part of the display unit 6b. The touch panel 25 is configured by embedding, for example, various types of sensors in a liquid crystal display panel, and is capable of displaying various types of information as well as receiving various types of operation input from an operator.

The controller 9 is a control device that is built into the MFP 10 and performs overall control of the MFP 10. The controller 9 is configured as a computer system that includes, for example, a CPU and various types of semiconductor memories (RAM and ROM). The controller 9 implements various types of processing units by causing the CPU to execute predetermined software programs (hereinafter, also simply referred to as "programs") stored in the ROM (e.g., EEPROM). Note that those programs (specifically, a group of program modules) may be recorded in a portable recording medium (or in other words, any of various types of non-transitory computer-readable recording media) such as a USB memory, read from the recording medium, and installed into the MFP 10. Alternatively, the programs may be downloaded via the network and installed into the MFP 10.

More specifically, as illustrated in FIG. 2, the controller 9 implements various types of processing units that includes a communication control unit 11, an input control unit 12, a display control unit 13, a determination unit 15, a setting unit 16, a transmission-destination determination unit 17, and a generation unit 18 by executing the above programs.

The communication control unit 11 is a processing unit that controls operations of communication with other devices (e.g., mobile terminal 50) in cooperation with the communication unit 4, for example. The communication control unit 11 includes a transmission control unit that controls operations of transmitting various types of data, and a reception control unit that controls operations of receiving various types of data.

The input control unit 12 is a control unit that controls operations of inputting operations to the operation input unit 6a (e.g., touch panel 25). For example, the input control unit 12 controls operations of receiving operation input (e.g., designation input from a user) to the operation screen displayed on the touch panel 25.

The display control unit 13 is a processing unit that controls display operations of the display unit 6b (e.g., touch panel 25). The display control unit 13 causes the touch panel 25 to display, for example, an operation screen (remote operation screen) for operating the MFP 10.

The determination unit 15 determines, for example, whether the operation screen to be displayed next (transition destination screen) (and the operation screen that is currently being displayed) is a common setting screen or an individual setting screen, as will be described later.

The setting unit 16 is a processing unit that performs setting processing on the own apparatus.

The transmission-destination determination unit 17 is a processing unit that determines a setting target child apparatus (apparatus to which settings information is transmitted) from among the MFPs 10.

The generation unit 18 is a processing unit that generates various types of operation screens (e.g., setting screens).

1-3. Configuration of Mobile Terminal

The mobile terminal 50 is an apparatus (remote operation apparatus) that remotely operates the MFPs 10 (image forming apparatuses).

Next is a description of the configuration of the mobile terminal 50.

The mobile terminal 50 is an information input/output terminal device (information terminal) capable of network communication with the MFPs 10. Here, a smartphone is illustrated as an example of the mobile terminal 50. The present invention is, however, not limited to this example, and the mobile terminal 50 may be other devices such as a tablet terminal or a personal computer.

Figure 3:
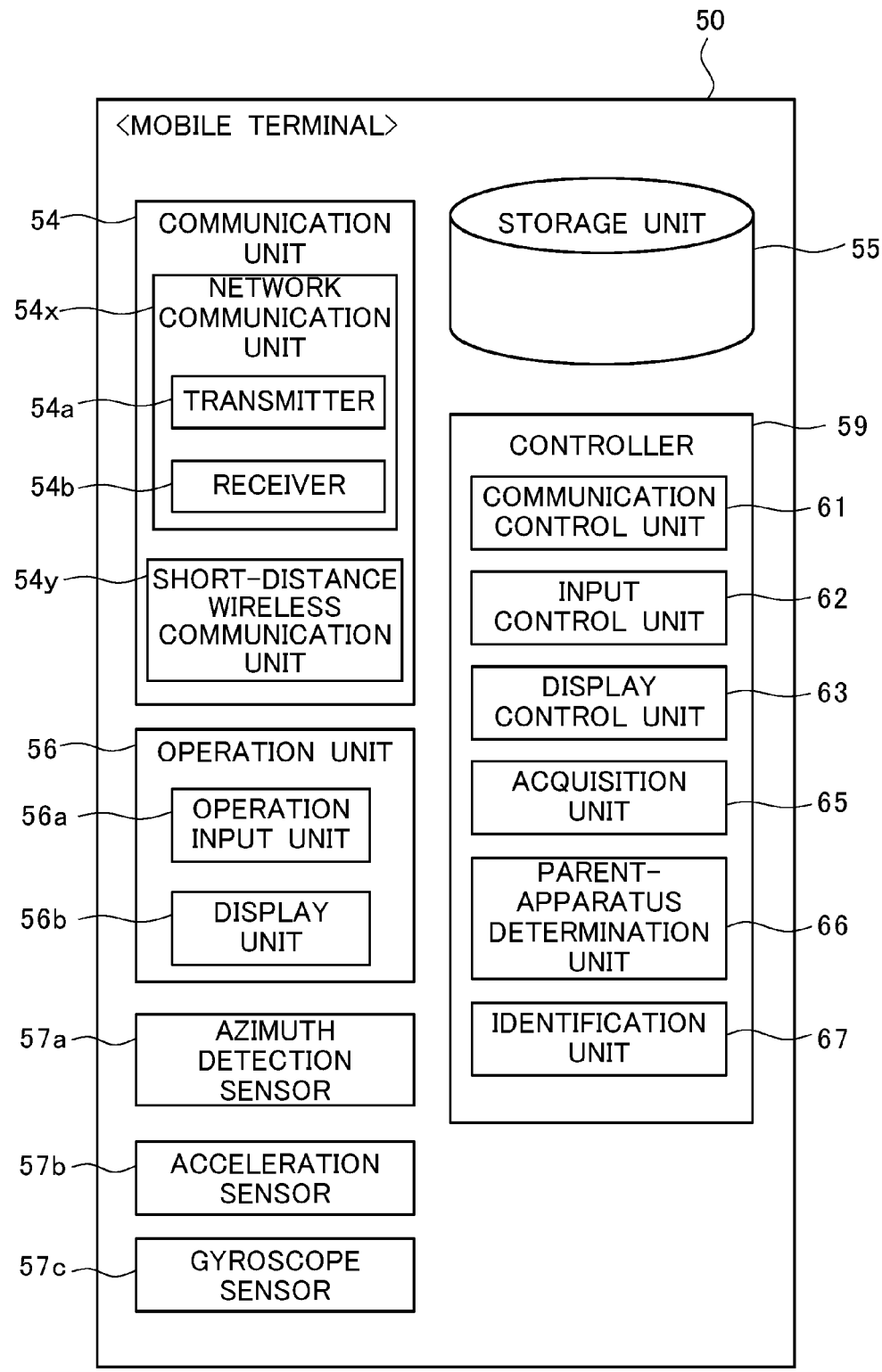
FIG. 3 is a functional block diagram illustrating an overall configuration of a mobile terminal.

FIG. 3 is a functional block diagram illustrating an overall configuration of the mobile terminal 50.

As illustrated in the functional block diagram of FIG. 3, the mobile terminal 50 includes, for example, a communication unit 54, a storage unit 55, an operation unit 56, an azimuth detection sensor (electromagnetic compass) 57a, an acceleration sensor 57b, a gyroscope sensor 57c, and a controller 59 and implements various types of functions by operating these units in combination.

The communication unit 54 is capable of various types of network communication. The communication unit 54 includes a network communication unit 54x that provides network communication (e.g., IEEE 802.11). The network communication unit 54x includes a transmitter 54a and a receiver 54b. The network communication unit 54x is capable of wireless communication and wired communication. The communication unit 54 also includes a short-distance wireless communication unit 54y that provides short-distance wireless communication.

The storage unit 55 is configured by a storage device such as a nonvolatile semiconductor memory. For example, the storage unit 55 temporarily stores various types of setting screens (see FIG. 13, for example) (to be more specific, image data of the setting screens) transmitted from a parent apparatus 10a, which will be described later.

The operation unit 56 includes an operation input unit 56a that accepts operation input to the mobile terminal 50, and a display unit 56b that displays and outputs various types of information. The mobile terminal 50 is provided with a touch panel 75 (see FIG. 1) that is configured by embedding, for example, various types of sensors in a liquid crystal display panel. The touch panel 75 not only functions as part of the operation input unit 56a but also functions as part of the display unit 56b. In particular, during communication connection in the remote operation mode (described later), the operation unit 56 displays an operation screen (e.g., setting screen) that is received from the parent apparatus (e.g., MFP 10a), which will be described later, and accepts user operations provided to the operation screen.

The azimuth detection sensor 57a is a sensor (detection unit) that detects the magnetism of the earth and detects an azimuth.

The acceleration sensor 57b is a sensor that detects the acceleration of the mobile terminal 50. The gyroscope sensor 57c is a sensor that detects the angular speed of the mobile terminal 50.

Use of the azimuth detection sensor 57a, the acceleration sensor 57b, and the gyroscope sensor 57c enables detection of, for example, the direction and distance of travel of the mobile terminal 50.

The controller 59 in FIG. 3 is built into the mobile terminal 50 and performs overall control of the mobile terminal 50. The controller 59 is configured as a computer system that includes, for example, a CPU and various types of semiconductor memories (e.g., RAM and ROM). The controller 59 implements various types of processing units by causing the CPU to execute predetermined software programs (hereinafter, also simply referred to as "programs") stored in the storage unit 55 (e.g., semiconductor memory). Note that the programs (specifically, a group of program modules) may be recorded in a portable recording medium (or in other words, any of various types of non-transitory computer-readable recording media) such as a USB memory, read from the recording medium, and installed into the mobile terminal 50. Alternatively, the programs may be downloaded via a network and installed into the mobile terminal 50.

The mobile terminal 50 has installed therein, for example, programs (remote operation programs) for remotely operating the MFPs 10.

More specifically, the controller 59 implements various types of processing units that include a communication control unit 61, an input control unit 62, a display control unit 63, an acquisition unit 65, a parent-apparatus determination unit 66, and an identification unit 67 by executing programs such as the remote operation programs.

The communication control unit 61 is a processing unit that controls operations of communication with, for example, the MFPs 10 in cooperation with the communication unit 54, for example.

The input control unit 62 is a control unit that controls operations of inputting operations to the operation input unit 56a (e.g., touch panel 75).

The display control unit 63 is a processing unit that controls display operations of the display unit 56b (e.g., touch panel 75). The display control unit 63 controls, for example, operations of displaying various types of operation screens transmitted from the MFPs 10.

The acquisition unit 65 acquires a relative positional relationship that indicates the relative positions of the MFPs 10 and also acquires, for example, a relative positional relationship between the current operational position of the mobile terminal 50 and the positions of the MFPs 10, on the basis of the results of detection by the various types of sensors of the mobile terminal 50.

The parent-apparatus determination unit 66 is a processing unit that determines a parent apparatus from among the MFPs (image forming apparatuses) 10 on the basis of apparatus information regarding the MFPs 10.

The identification unit 67 is a processing unit that execute processing such as identifying a setting target apparatus from among the image forming apparatuses.

The controller 59 controls processing, such as making settings on the MFPs 10, by using the above-described various types of processing units. As will be described in detail later, when the mobile terminal 50 of the present embodiment is connected with a certain MFP (to be more specific, parent MFP) 10a in the remote panel mode, the mobile terminal 50 is capable of performing setting operations not only on the MFP 10a but also on the others MFPs (e.g., MFPs 10b and 10c) that are connected via the network to the MFP 10a.

The storage units 5 of the MFPs 10 store information regarding multiple operation screens (e.g., image data of the setting screens, or a screen data table 200). FIG. 4 illustrates an example of the screen data table 200. As illustrated in FIG. 4, the screen data table 200 includes, for example, "Screen ID," "Screen Name," and "Type" of each operation screen. The screen ID is an identifier (ID) for use in identifying the operation screen (e.g., setting screen), and the screen name is the name of the operation screen. The "type" is information that indicates the screen type such as "Initial Screen," "Common Setting Screen," or "Individual Setting Screen."

1-4. Operations

Figure 5:
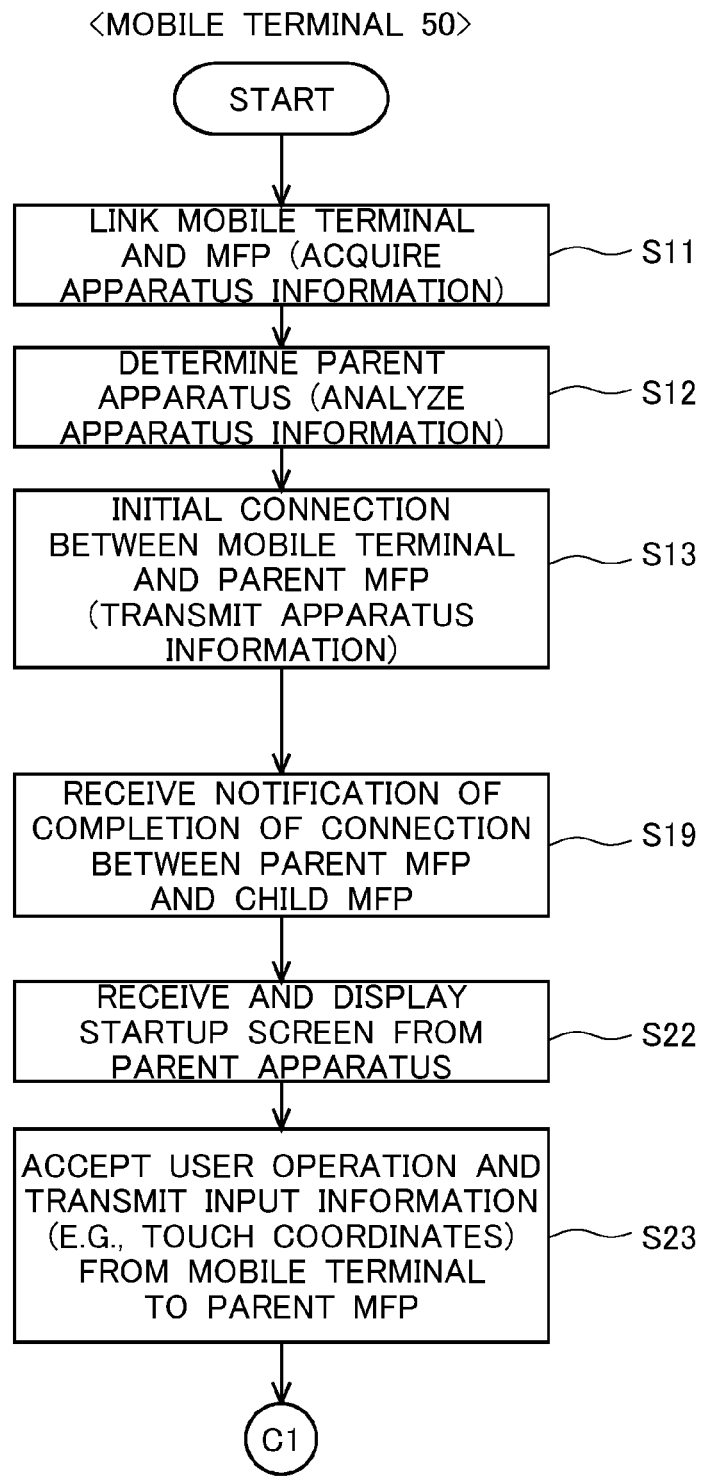
FIG. 5 is a flowchart of operations performed by the mobile terminal.
Figure 6:
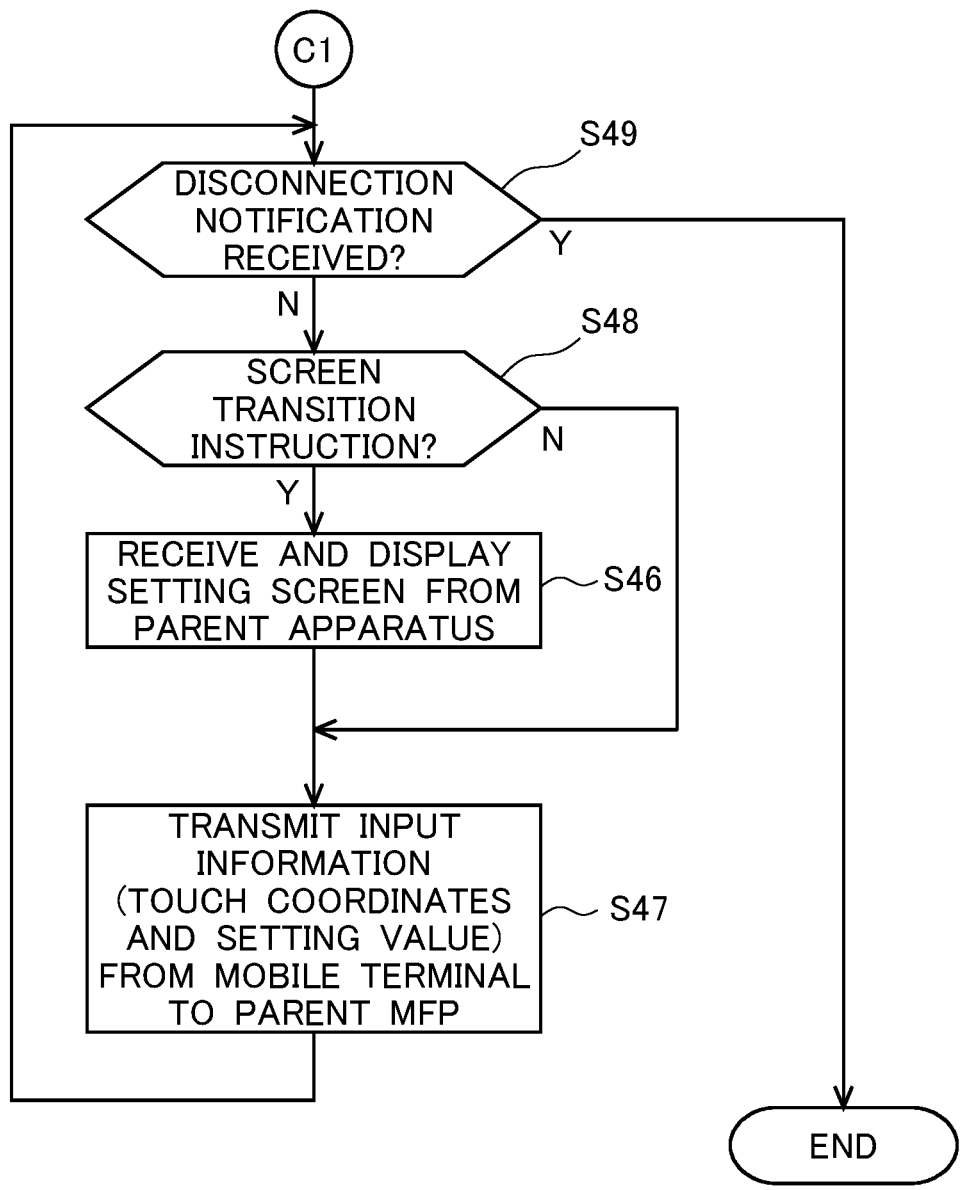
FIG. 6 is a flowchart of operations performed by the mobile terminal.
Figure 7:
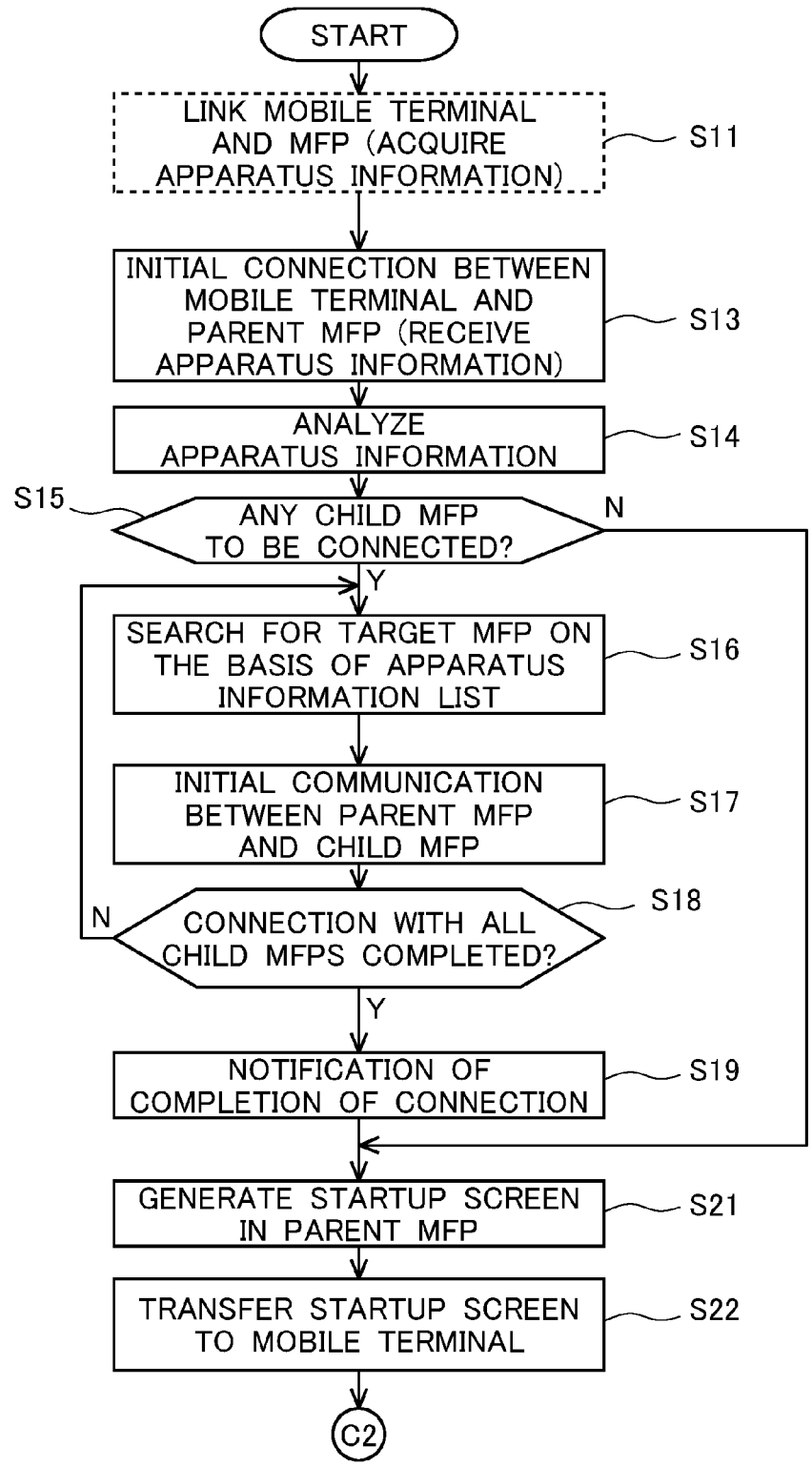
FIG. 7 is a flowchart of operations performed by a MFP.
Figure 8:
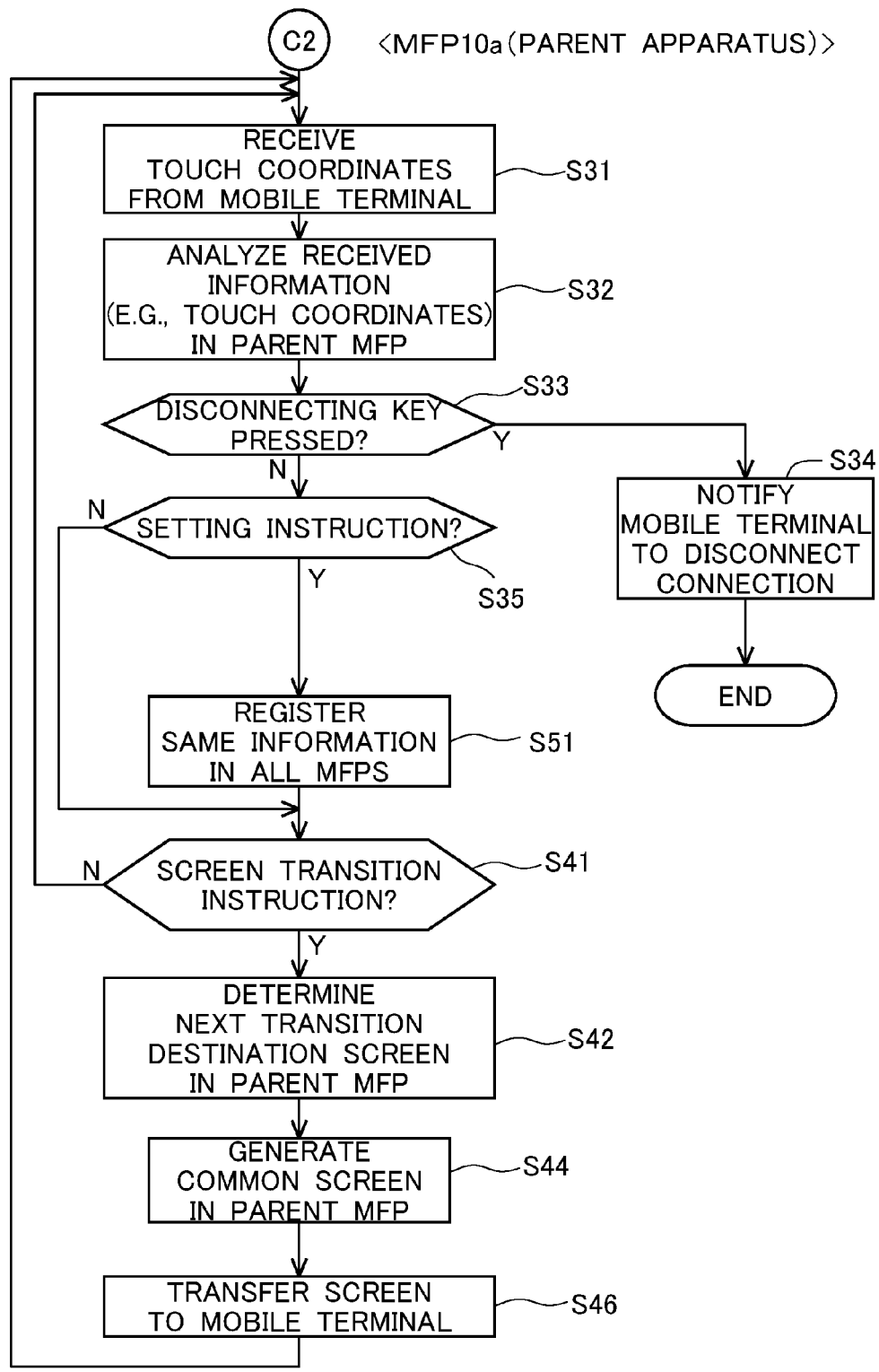
FIG. 8 is a flowchart of operations performed by the MFP.
Figure 9:
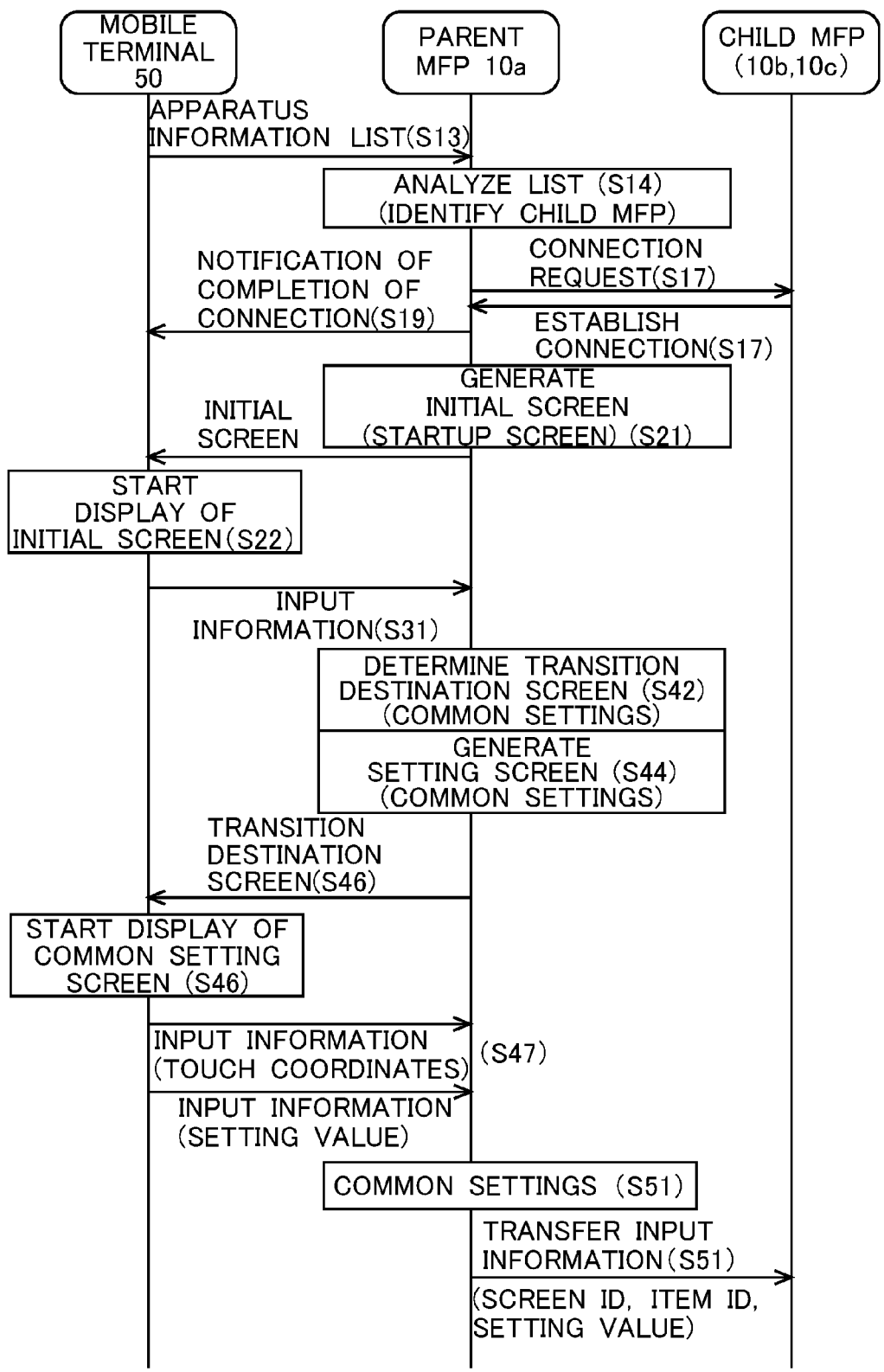
FIG. 9 is a timing chart illustrating an example of operations performed in the image forming system.

FIGS. 5 and 6 illustrate a flowchart of operations performed by the mobile terminal 50, and FIGS. 7 and 8 illustrate a flowchart of operations performed by a MFP 10 (to be more specific, parent apparatus 10a, which will be described later). FIG. 9 is a timing chart showing an example of operations performed in this system. Hereinafter, the operations performed in the system 1 will be described with reference to the drawings.

Figure 10:
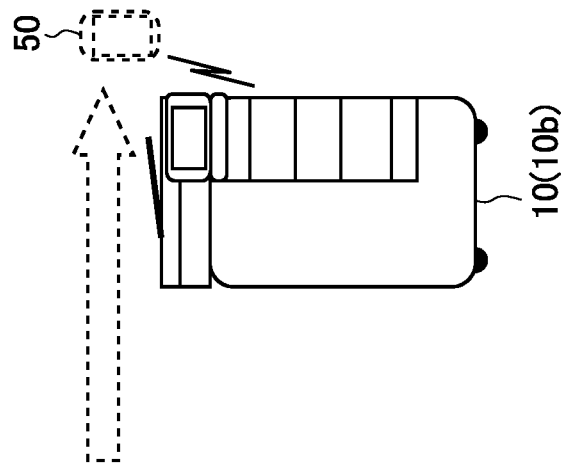
FIG. 10 is a conceptual diagram illustrating processing for acquiring apparatus information regarding multiple MFPs.

First, the mobile terminal 50 performs processing for acquiring apparatus information regarding multiple MFPs 10 (10a, 10b, and 10c) that constitute a single group as in step S11 (e.g., FIG. 5). More specifically, an operator (user) sequentially moves to the locations where the MFPs 10 are placed, as illustrated in FIG. 10. Along with the travel of the user, individual short-distance wireless communication between the mobile terminal 50 held by the user and each of the MFPs 10 is established at the location of the MFP 10, and as a result, the mobile terminal 50 (acquisition unit 65) acquires apparatus information regarding the MFPs 10. Examples of the acquired "apparatus information" regarding each MFP 10 include network information (e.g., IP address) regarding the MFP, the product code (model code) of the MFP, firmware version information, and hardware information (e.g., CPU and panel size). The intensity (radio field intensity) of the network communication (wireless network communication) between each MFP 10 and the base station of the wireless network communication (access point of the wireless LAN) is also acquired as the "apparatus information" regarding the MFP 10. It is assumed here that, in the initial state, each MFP 10 has an IP address that is automatically allocated by dynamic IP-address allocation (dynamic host configuration protocol: DHCP).

To be more specific, for example, the operator first approaches the nearest MFP 10c and brings the mobile terminal 50 close to the MFP 10c in step S11. More specifically, the operator brings the mobile terminal 50 close to (or into contact with) an NFC touch unit of the MFP 10c. At this time, the mobile terminal 50 establishes short-distance wireless communication with the MFP 10c and receives apparatus information regarding the MFP 10c. Next, the operator approaches the next nearest MFP 10a and brings the mobile terminal 50 close to the MFP 10a. The mobile terminal 50 establishes short-distance wireless communication with the MFP 10a and receives apparatus information regarding the MFP 10a. The operator then further approaches another MFP 10b and brings the mobile terminal 50 close to the MFP 10b. The mobile terminal 50 establishes short-distance wireless communication with the MFP 10b and receives apparatus information regarding the MFP 10b.

In this way, the mobile terminal 50 acquires apparatus information regarding the multiple MFPs 10 (10a, 10b, 10c) directly from the MFPs 10.

Next, in step S12, the mobile terminal 50 (parent-apparatus determination unit 66) determines a "parent apparatus (also referred to as a "parent MFP") from among the MFPs 10 on the basis of the apparatus information regarding the MFPs 10.

Here, the "parent apparatus" is one apparatus (MFP) selected from among the MFPs 10. As will be described later, the mobile terminal 50 establishes communication connection (also referred to as "remote panel connection") in the remote operation mode with only the parent apparatus. Using remote operations through the remote panel connection, the mobile terminal 50 performs setting processing on the parent apparatus and also setting processing on child apparatuses (apparatuses other than the parent apparatus among the MFPs 10) via the parent apparatus.

The mobile terminal 50 determines, for example, an apparatus with highest performance (highest hardware performance) among the MFPs 10 as the "parent apparatus." This enables relatively high-speed communication (processing that involves transmission and reception of operation screens) with the mobile terminal 50. The present invention is, however, not limited to this example, and the mobile terminal 50 may determine an apparatus provided with the newest version of firmware among the MFPs 10 as the "parent apparatus." As another alternative, the mobile terminal 50 may determine an MFP with highest intensity of network communication with the base station of the wireless network communication among the MFPs 10 as the "parent apparatus." In either case, relatively high-speed communication (processing that involves transmission and reception of operation screens) is possible with the mobile terminal 50.

Here, the description continues assuming that the MFP 10a is determined as the "parent apparatus (parent MFP)."

In step S13, the mobile terminal 50 transitions the operation mode of the mobile terminal 50 to the remote operation mode (also referred to as a "remote panel mode") in which the mobile terminal 50 operates as a remote operation apparatus of the parent apparatus 10a.

The remote operation mode is a mode in which the mobile terminal 50 establishes direct communication connection with only one (parent apparatus) of the MFPs 10, receives an operation screen (to be more specific, image data of the operation screen) from the one apparatus, and remotely operates the parent apparatus 10a through the received operation screen. In the remote operation mode, the mobile terminal 50 is capable of performing various types of setting operations on the parent apparatus 10a through the operation screens received from the parent apparatus 10a. As will be described later, the mobile terminal 50 is also capable of performing various types of setting operations on the other apparatuses 10b and 10c (not only on the parent apparatus 10a) among the MFPs 10 through the operation screens transmitted from the parent apparatus 10a.

In step S13, the mobile terminal 50 establishes communication connection in the remote operation mode (remote panel mode) with the parent apparatus 10a determined in step S12. In response to the establishment of this communication connection, the operation mode of the parent apparatus 10a transitions to a remotely operable mode in which the parent apparatus 10a accepts remote operations provided by the mobile terminal 50.

At this time, the mobile terminal 50 also transmits the apparatus information regarding each of the MFPs 10 to the parent apparatus (10a). The parent apparatus (MFP 10a) is thus capable of acquiring the apparatus information (e.g., IP address) regarding the child apparatuses (MFPs 10b and 10c). As described above, the apparatus information includes, for example, network information (e.g., IP address), product code (model code), firmware version information, hardware information (e.g., CPU and panel size), and the intensity of network communication.

After the communication connection in the remote operation mode between the parent apparatus 10a and the mobile terminal 50 is established in step S13, processing of step S14 onward is performed while the communication connection is maintained.

In step S14, the parent apparatus 10a analyzes the apparatus information received in step S13. For example, the parent apparatus 10a identifies apparatuses (child apparatuses) other than the own apparatus (parent apparatus) from among the MFPs 10 constituting a group, and acquires information regarding each child apparatus, such as a communication destination address. Here, it is assumed that the parent apparatus 10a has identified the MFPs 10b and 10c as child apparatuses and acquired the IP addresses of the MFPs (child apparatuses) 10b and 10c.

In steps S15 to S19, communication (parent-child communication) is established between the parent apparatus 10a and each of the child apparatuses 10b and 10c. This communication (parent-child communication) is communication established via another route different from the route used in the above remote panel connection. In the system 1, the aforementioned remote panel connection and the parent-child connection coexist simultaneously.

To be more specific, the presence or absence of a child apparatus to be connected is determined (step S15), and one child apparatus 10b is identified from among multiple child apparatuses on the basis of the apparatus information (step S16). Then, communication is established between the identified child apparatus 10b and the parent apparatus 10a, and initial communication is held between the child apparatus 10b and the parent apparatus 10a (step S17). When the presence of a child apparatus that has not yet hold initial communication with the parent apparatus is determined in step S18, the procedure returns to step S16 and the same operations are repeated. As a result, initial communication or the like is held between another child apparatus 10c and the parent apparatus 10a. When it is determined in step S18 that the establishment of connection (initial communication) with all of the child apparatuses is completed, a notification of completion of the connection is transmitted from the parent apparatus 10a to the mobile terminal 50 (step S19).

Figure 11:
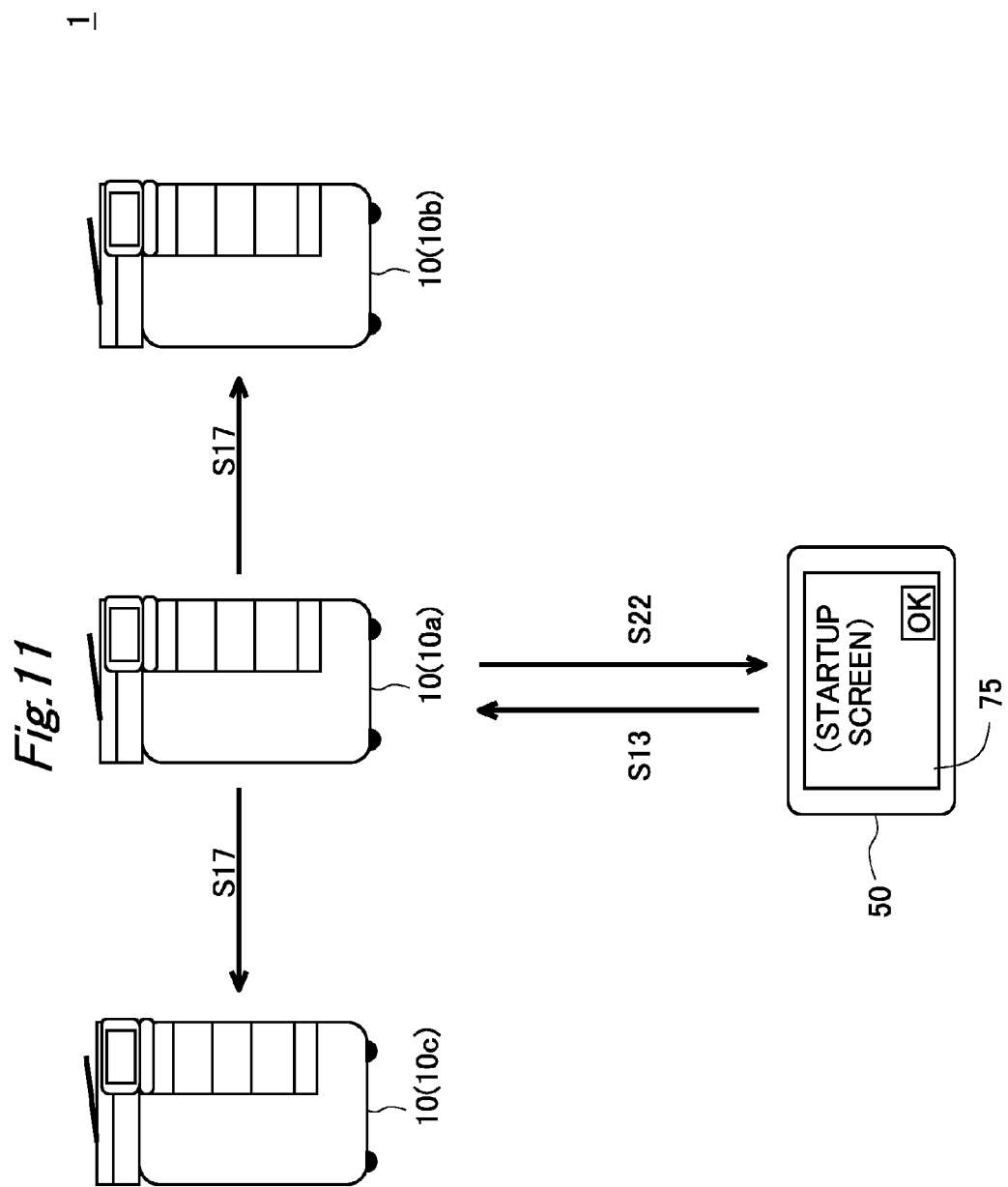
FIG. 11 is a conceptual diagram of operations that are performed immediately after the start of connection in a remote operation mode.

In step S21, the parent apparatus 10a generates a startup screen (initial screen) that is to be initially displayed on the mobile terminal 50. Then, in step S22, the startup screen (to be specific, image data compressed in a predetermined format) is transmitted to the mobile terminal 50. When the startup screen is received from the parent apparatus 10a in step S22 (see also FIG. 5), the mobile terminal 50 displays the startup screen on the touch panel 75 (see also FIGS. 9 and 11).

When the operator presses the OK button on the startup screen for transition to the next screen, the mobile terminal 50 accepts this user operation and transmits operation information (here, coordinate information (touch coordinates) regarding the pressed position (touched position)) to the parent apparatus 10a (step S23).

When the operation information (touch coordinates) is received (step S23 or step S31 in FIG. 8), the parent apparatus 10a analyzes the operation information (received information) and ascertains instruction content of the user operation.

According to the result of analysis, the parent apparatus 10a performs branch processing in steps S33, S35, and S41 (FIG. 8). Here, the instruction is determined as an instruction as to screen transition (instruction to press the OK button), and the procedure proceeds via step S41 to step S42.

In step S42, the parent apparatus 10a determines the next transition destination screen on the basis of, for example, the screen data table 200 (see FIG. 4). Here, the parent apparatus 10a determines a setting screen (common setting screen) for setting "common setting items" among multiple setting items as the next transition destination screen.

Here, the "common setting items" are setting items that are set to the common (same) setting in the MFPs 10. For example, the setting items regarding the software DIP switch of the printer in multiple MFPs 10 with the same functions may be set to the same setting value (e.g., "16843"). Note that the value "16843" (decimal notation) is a setting value (setting value consisting of multiple bits, such as 32 bits) that is obtained by integrating multiple individual setting values (each individual setting value consists of one to several bits). The setting item regarding the software DIP switch of the printer is one of the "common setting items." Examples of the common setting items also include the setting item regarding the software DIP switch of the scanner and the setting item regarding the software DIP switch of the auto document feeder (ADF) (see FIG. 4). The setting item regarding the presence or absence (mounting or non-mounting) of a finisher (postprocessor) is also illustrated as an example of the common setting items.

After this, the parent apparatus 10a generates a screen for setting the common setting items, stored in the parent apparatus 10a, as a common setting screen (to be specific, image data compressed in a predetermined format) (step S44), and transmits this common setting screen 310 to the mobile terminal 50 (step S46). The parent apparatus 10a transmits the common setting screen 310 as an operation screen of the mobile terminal 50 to the mobile terminal 50.

Figure 12:
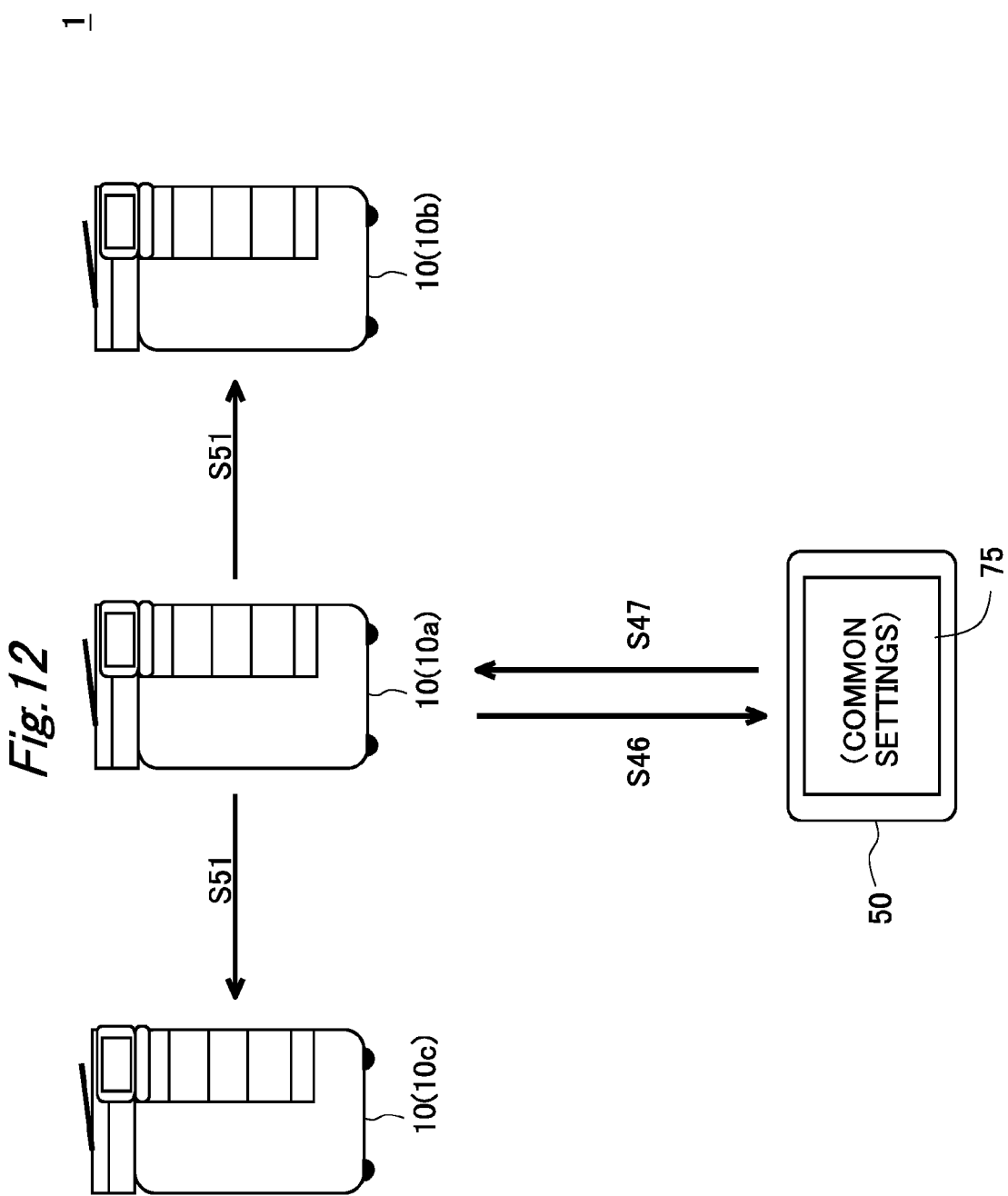
FIG. 12 is a conceptual diagram illustrating a setting operation using a common setting screen.

When the common setting screen (to be specific, image data of the common setting screen) 310 is received from the parent apparatus 10a, the mobile terminal 50 determines that the screen transition instruction has been accepted (step S48) (see also FIG. 6), and displays the common setting screen 310 received from the parent apparatus 10a on the touch panel 75 (step S46) (see also FIGS. 9 and 12). The mobile terminal 50 then stands by for a user operation to be provided through the common setting screen 310.

Figure 13:
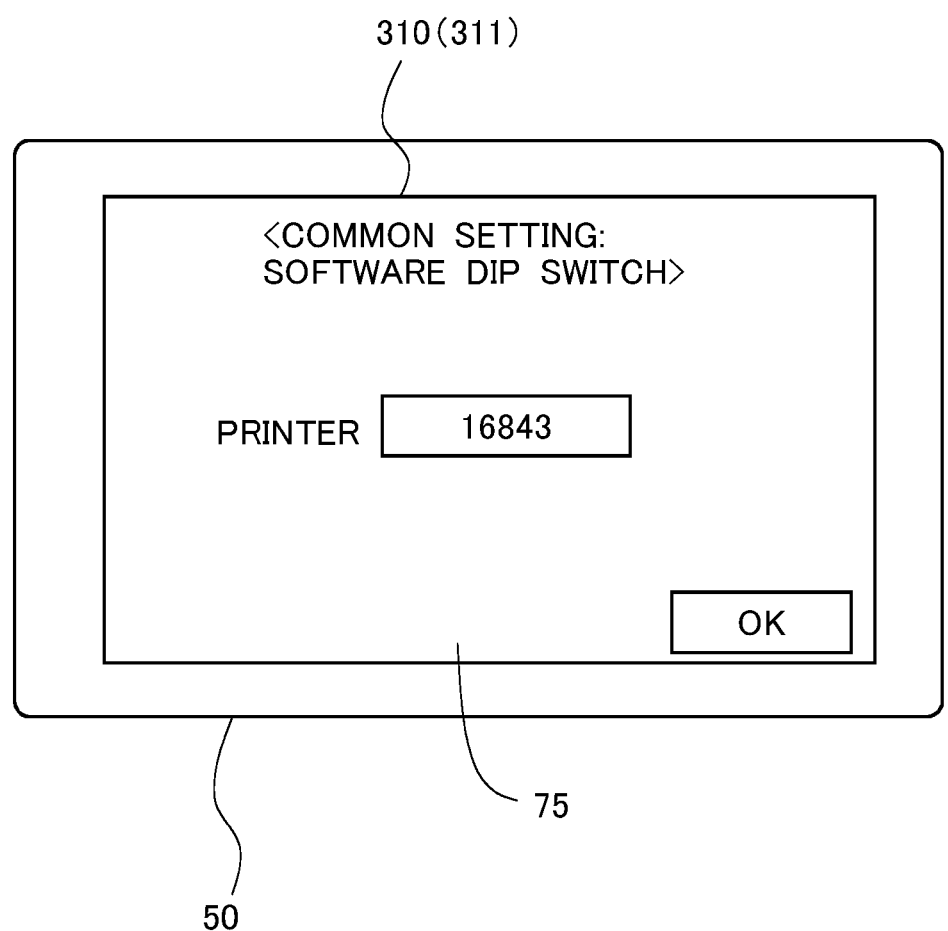
FIG. 13 illustrates a setting screen (common setting screen) for setting a setting item regarding a software DIP switch of a printer.
Figure 14:
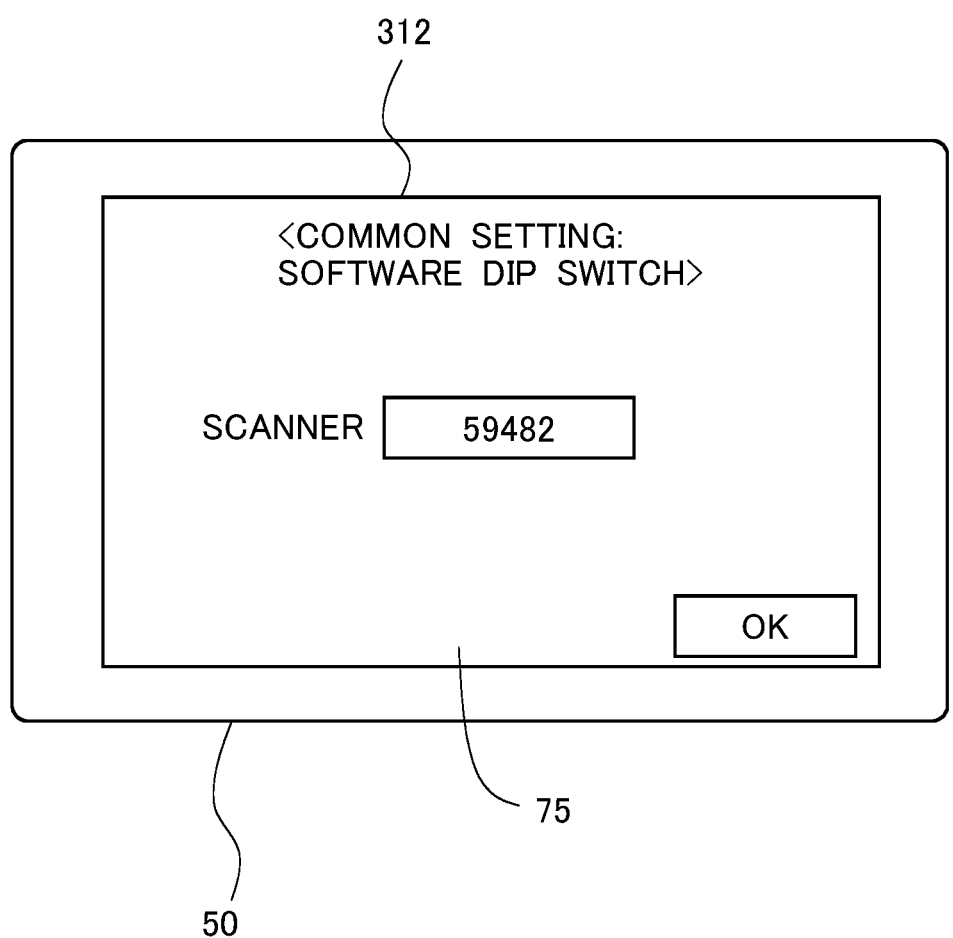
FIG. 14 illustrates a setting screen (common setting screen) for setting a setting item regarding a software DIP switch of a scanner.
Figure 15:
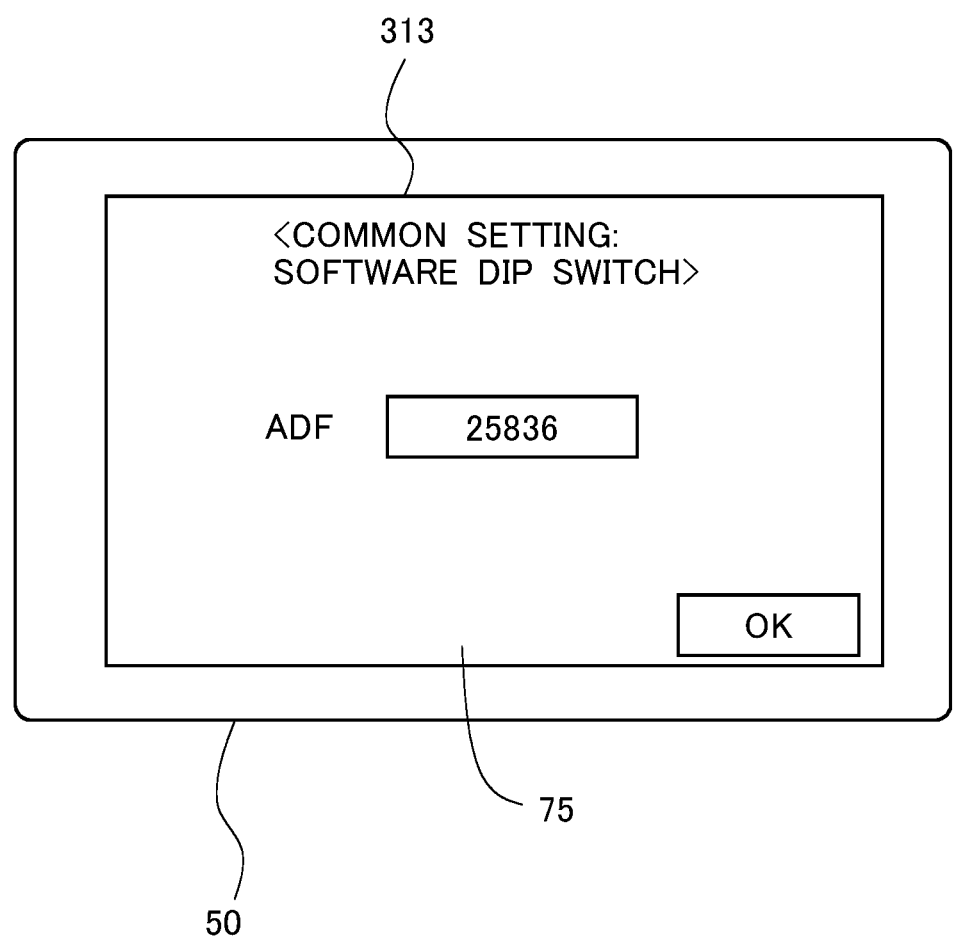
FIG. 15 illustrates a setting screen (common setting screen) for setting a setting item regarding a software DIP switch of an ADF.
Figure 16:
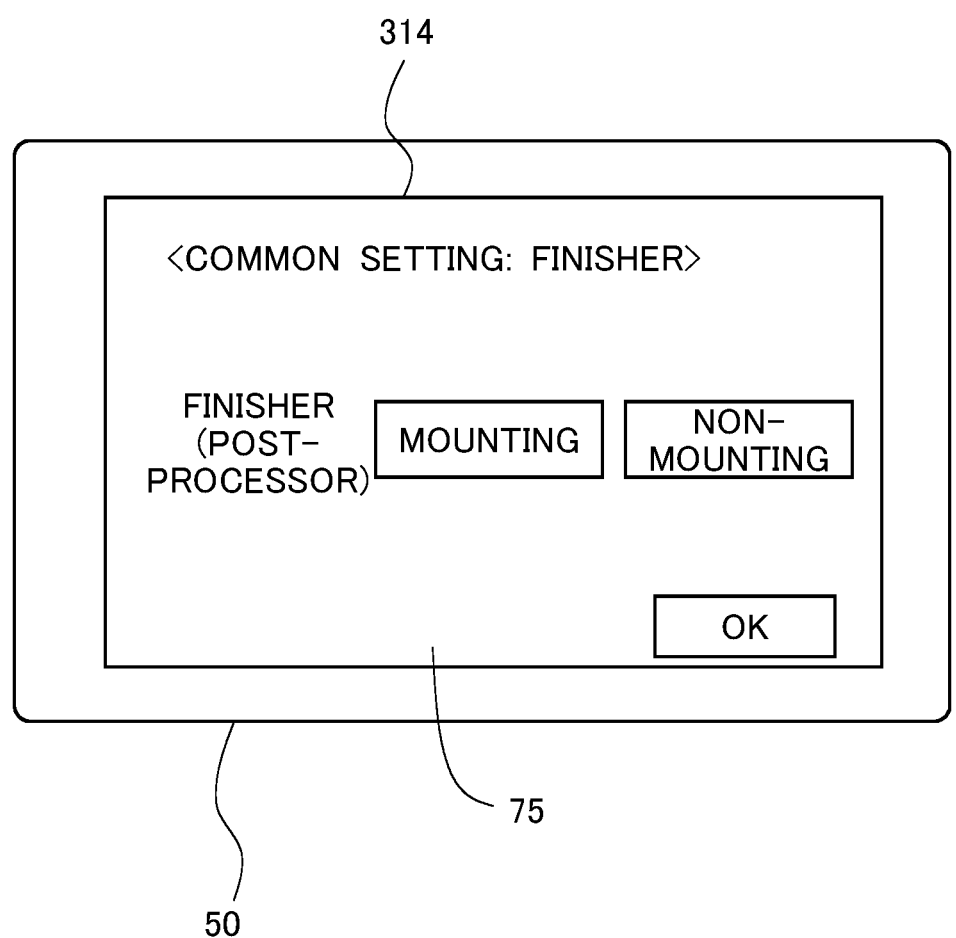
FIG. 16 illustrates a screen for setting the presence or absence of a finisher.

FIG. 13 illustrates a setting screen (common setting screen) 311 (310) for setting the setting item regarding the software DIP switch of the printer. FIG. 14 illustrates a setting screen (common setting screen) 312 for setting the setting item regarding the software DIP switch of the scanner, and FIG. 15 illustrates a setting screen (common setting screen) 313 for setting the setting item regarding the software DIP switch of the ADF. FIG. 16 illustrates a setting screen 314 for setting the presence or absence (mounting or non-mounting) of the finisher (postprocessor). For example, each of those screens 311 to 314 may be displayed as the common setting screen 310. In the present example, each setting screen has a single setting item, but the present invention is not limited to this example, and each setting screen may have multiple setting items.

When the operator provides a user operation through the common setting screen 310, the mobile terminal 50 accepts the user operation. The mobile terminal 50 then transmits operation information received through the user operation to the parent apparatus 10a (step S47). This operation information is also referred to as "setting information" (also referred to as "first setting information") received according to the user operation. The first setting information may be transmitted at one time through a single communication operation, or may be transmitted through multiple communication operations according to, for example, the user operation.

For example, when the input field of the setting item regarding the software DIP switch of the printer is pressed and the value "16843" is input to the input field on the screen 311 as illustrated in FIG. 13, the coordinates (touch coordinates) of the pressed position (pressed operational position) of the input field and the value (setting input value) that is input to the input field are transmitted from the mobile terminal 50 to the parent apparatus 10a. In this case, the parent apparatus 10a is capable of recognizing the item ID of the setting item and the setting content of the setting item and setting the setting content of the setting item regarding the software DIP switch of the printer to "16843" on the basis of the above information (see, for example, steps S31, S32, and S51, which will be described later).

In this way, both of the coordinate information (touch coordinates) regarding the pressed position (touched position) and the input value for setting (setting input value) may be transmitted as the first setting information. The present invention is, however, not limited to this example, and only the touch coordinates may be transmitted as the first setting information. For example, when the button for setting "mounting" is pressed on the screen 314 as illustrated in FIG. 16, only the coordinates (touch coordinates) of the pressed position (pressed operational position) of this button is transmitted from the mobile terminal 50 to the parent apparatus 10a. In this case, when the information regarding the touch coordinates is received, the parent apparatus 10a is capable of setting the setting content of the setting item regarding mounting/non-mounting of the finisher to "mounting" on the basis of the touch coordinates (coordinate values in the "mounting" button) (see, for example, steps S31, S32, and S51 which will be described later).

When the setting information (first setting information) is received (step S3 in FIG. 8), the parent apparatus 10a analyzes the first setting information (received information) and determines (ascertains) the instruction content of the user operation.

According to the result of the analysis, the parent apparatus 10a performs branch processing in steps S33, S35, and S41. For example, when the analysis result indicates that the user operation is an operation of setting the setting item, "YES" is selected in step S35 and the procedure proceeds to step S51.

In step S51, the parent apparatus 10a determines that the same content is to be registered in all of the MFPs 10 on the basis of the fact that the setting operation using the common setting screen 310 has been performed. In other words, all of the MFPs 10a, 10b, and 10c including the parent apparatus 10a and the child apparatuses 10b and 10c are determined as "setting target apparatuses" (apparatuses targeted for setting processing). Note that the child apparatuses 10b and 10c among the above apparatuses are also determined as "setting target child apparatuses." The "setting target child apparatuses" are apparatuses (child apparatus) other than the parent apparatus among the multiple apparatuses, and are apparatuses (child apparatuses) on which setting processing is to be performed on the basis of the information received from the parent apparatus.

Then, two types of registration processing (more specifically, registration processing for the own apparatus (parent apparatus) and registration processing for the child apparatuses) are performed.

First, the parent apparatus 10a performs registration processing for the own apparatus 10a. More specifically, as to the concerned common setting item, the parent apparatus 10a sets the setting input value transmitted via the mobile terminal 50 as the setting content in the parent apparatus 10a.

The parent apparatus 10a also performs registration processing for the child apparatuses 10b and 10c. More specifically, the parent apparatus 10a generates setting information (second setting information) for making settings on the child apparatuses among the MFPs, on the basis of the setting information (first setting information) transmitted from the mobile terminal 50 according to the user operation provided through the mobile terminal 50. The parent apparatus 10a then transmits the second setting information to the child apparatuses 10b and 10c. To be more specific, the parent apparatus 10a transmits the second setting information directly to the child apparatuses 10b and 10c without going through the mobile terminal 50 (or in other words, via another route different from the route of communication in the remote operation mode between the parent apparatus 10a and the mobile terminal 50).

For example, when the touch coordinates corresponding to the setting item and the setting input value of the setting item are received as the first setting information from the mobile terminal 50, the parent apparatus 10a generates the setting information (second setting information) as follows. More specifically, the parent apparatus 10a adds the screen ID of the common setting screen 310 regarding the concerned common setting item and generates, as the second setting information, information in which the "touch coordinates" corresponding to the setting item are converted into the "item ID of the setting item." That is, the parent apparatus 10a generates, as the second setting information, information that includes the screen ID of the common setting screen regarding the concerned common setting item, the item ID of the setting item, and the setting input value of the setting item. The parent apparatus 10a then transmits this second setting information to each of the child apparatuses 10b and 10c. Note that the present invention is not limited to this example, and the second setting information may include the "touch coordinates" corresponding to the setting item as-is, instead of the item ID of the setting item. In this case, the child apparatus (e.g., 10b) on the reception side may convert the "touch coordinates" into the "item ID of the setting item."

The child apparatuses (setting target child apparatuses) 10b and 10c each set setting content that is based on the second setting information received from the parent apparatus 10a in the own child apparatuses 10b and 10c. More specifically, the child apparatuses 10b and 10c set the common setting item to the same content as the setting content set in the parent apparatus 10a. By performing the processing for setting the common setting items in this way, the same content of the common setting items is registered in all of the MFPs 10 (10a, 10b, 10c). Then, the processing of the parent apparatus 10a again returns to step S31.

After this, when the operator has pressed the OK button on the common setting screen, the mobile terminal 50 accepts this user operation and transmits operation information (here, coordinate information (touch coordinates) regarding the pressed position (touched position)), to the parent apparatus 10a (step S47).

When the operation information (touch coordinates) is received (step S31 in FIG. 8), the parent apparatus 10a analyzes this information (received information) and ascertains the instruction content of the user operation.

The parent apparatus 10a determines that the user operation is an operation of pressing the OK button and provides a screen transition instruction, and the procedure proceeds via step S41 to step S42.

In step S42, the parent apparatus 10a determines the next transition destination screen on the basis of, for example, the screen data table 200 (see FIG. 4). For example, a setting screen (common setting screen) regarding another "common setting item" is determined as the next transition destination screen. The parent apparatus 10a then generates the common setting screen (to be more specific, image data compressed in a predetermined format) (step S44), and transmits the common setting screen to the mobile terminal 50 (step S46).

From then on, the same operations are repeatedly performed.

Thereafter, when a "disconnecting key" (not shown) is pressed in a certain operation screen (e.g., final screen) that is displayed on the touch panel 75, this operation information (e.g., touch coordinates) is transmitted from the mobile terminal 50 to the parent apparatus 10a (step S47). The parent apparatus 10a receives the operation information (step S31) and determines on the basis of the operation information (e.g., touch coordinates) that the disconnecting key has been pressed (step S32). The parent apparatus 10a then transmits a disconnection notification to the mobile terminal 50 (step S34) and disconnects the connection with the mobile terminal 50. When the disconnection notification is received (step S49), the mobile terminal 50 ends the processing illustrated in the flowchart.

The operations as described above enable the user to provide setting operations through the setting screen (operation screens of the MFP 10) transmitted from the parent apparatus 10a to the mobile terminal 50, within a period during which the mobile terminal 50 and the parent apparatus 10a are connected to each other in the remote operation mode. Then, the first setting information based on the user operation (e.g., touch coordinates or a setting input value of the option on the setting screen) is transmitted from the mobile terminal 50 to the parent apparatus 10a (step S47). The parent apparatus 10a then transmits the second setting information based on the first setting information to each of the child apparatuses 10b and 10c (directly without going through the mobile terminal 50), and the child apparatuses 10b and 10c receive the second setting information from the parent apparatus 10a through the communication with the parent apparatus 10a. In other words, the setting information is transmitted from the mobile terminal 50 to each of the child apparatuses 10b and 10c in order to make settings on the child apparatuses among the MFPs 10. Then, the child apparatuses 10b and 10c make settings on the child apparatuses 10b and 10c on the basis of the second setting information received from the parent apparatus 10a.

In this way, the mobile terminal 50 is capable of transmitting the setting information to the child apparatuses 10b and 10c and making settings on the child apparatuses 10b and 10c through the communication between the mobile terminal 50 and the parent apparatus 10a and the communication between the parent apparatus 10a and each of the child apparatuses 10b and 10c. In other words, the mobile terminal 50 is capable of making settings on other child apparatuses 10*b* and 10*c* with communication established with only the parent apparatus 10*a*. This eliminates the need to reestablish remote connection between the mobile terminal 50 and the other child apparatuses (child MFPs) in order to make settings on the child apparatuses, thus facilitating operations. In short, the mobile terminal 50 is capable of more easily performing setting processing on the MFPs 10 while using the operation screens of the MFPs 10.

2. Second Embodiment

Although in the first embodiment described above, only the processing (common setting processing) for setting the common setting items is performed, the present invention is not limited to this example. For example, processing (individual setting processing) for setting "individual setting items" (setting items that are set to different settings among the MFPs 10*s*) may be performed.

A second embodiment illustrates a mode in which not only the processing for setting "common setting items" but also the processing for setting "individual setting items" are performed.

Figure 17:
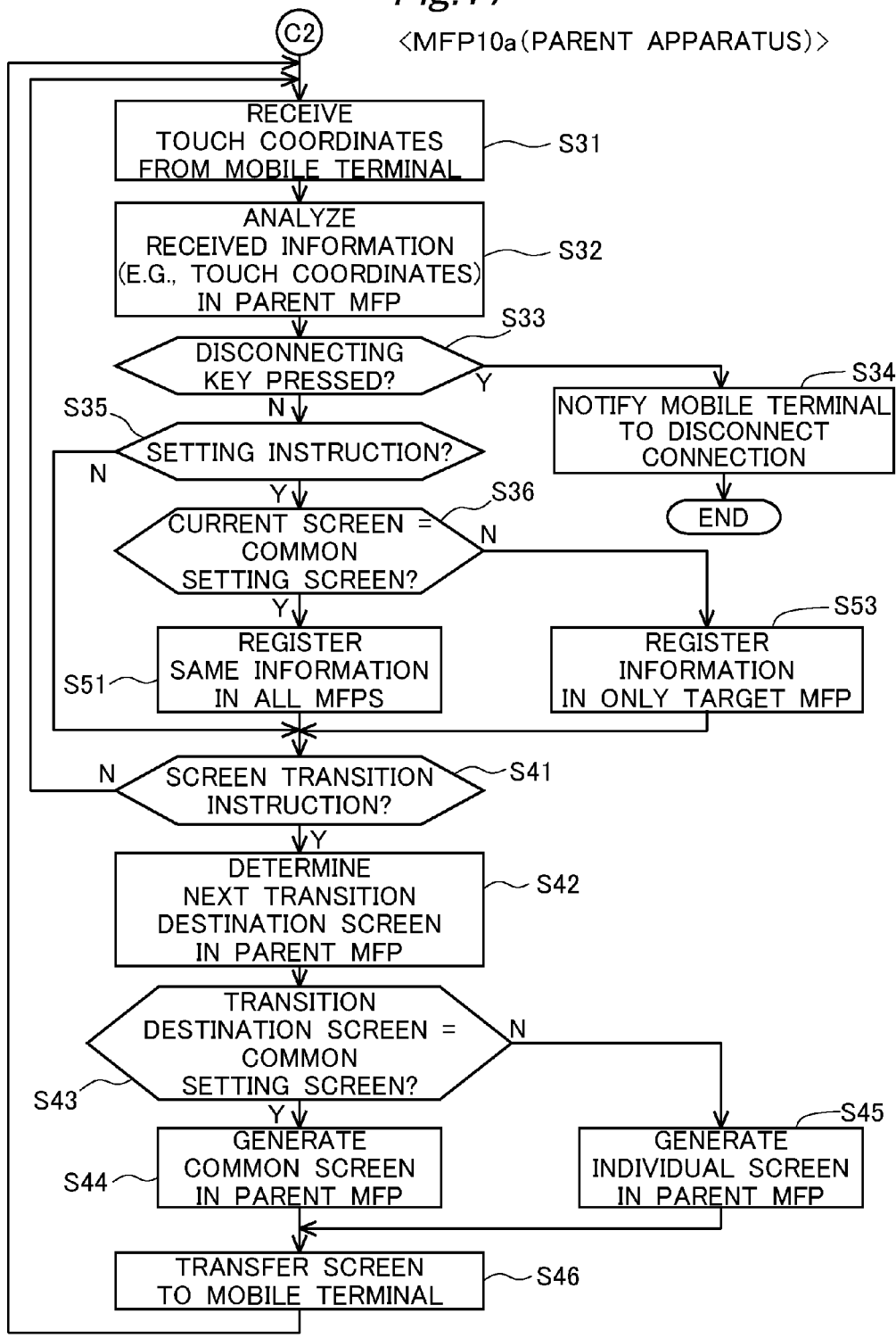
FIG. 17 is a flowchart of operations performed by a MFP according to a second embodiment.
Figure 18:
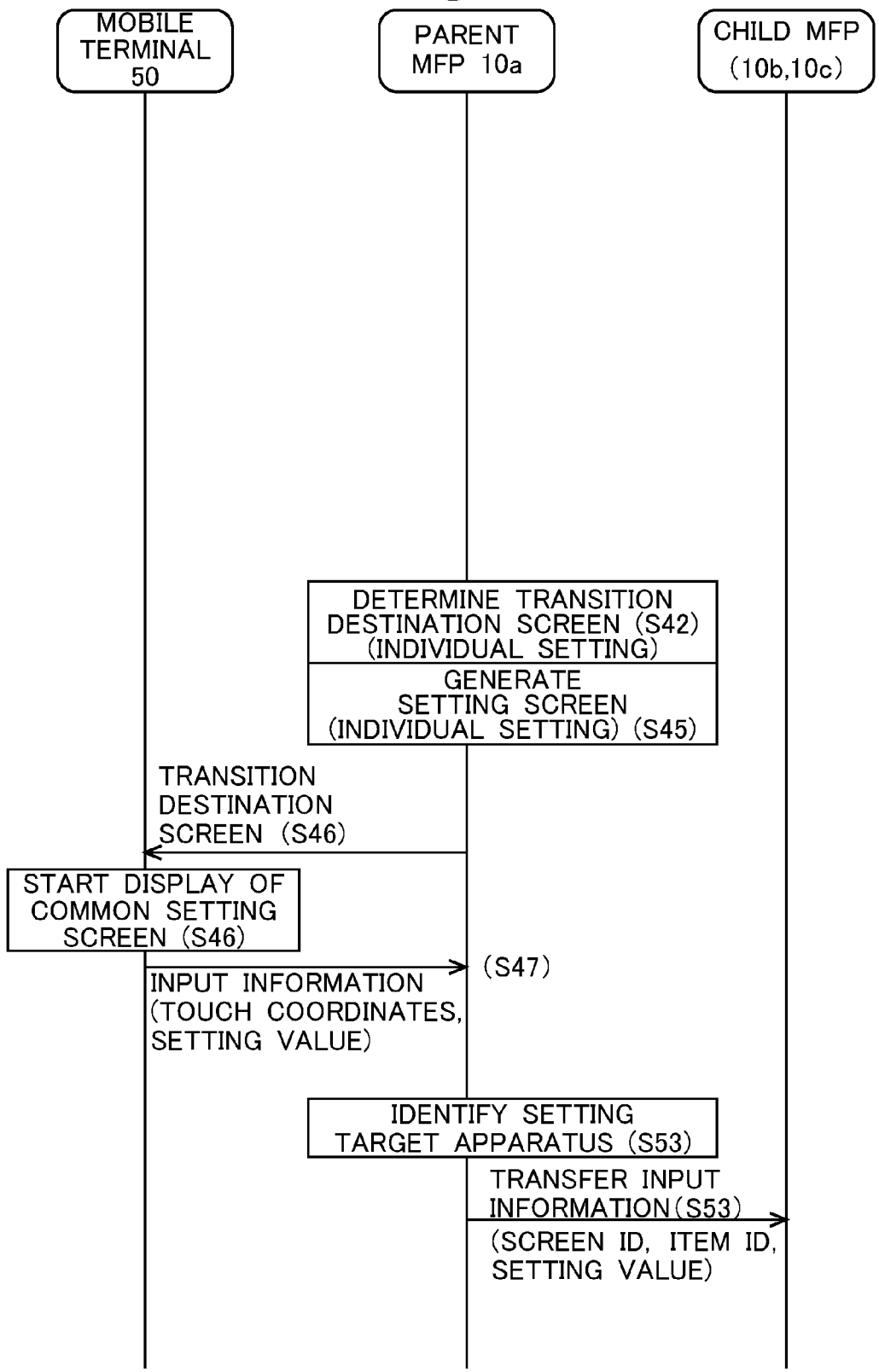
FIG. 18 is a timing chart illustrating an example of operations performed in an image forming system according to the second embodiment.

FIG. 17 is a flowchart of operations performed by the parent apparatus 10*a* according to the second embodiment, and FIG. 18 is a timing chart showing an example of operations (in particular, operations related to the "individual setting processing") performed in the system according to the second embodiment. The second embodiment is different from the first embodiment in that the operations illustrated in FIG. 17 are performed, instead of the operations in FIG. 8. FIG. 17 is different from FIG. 8 in that steps S36, S53, S43, and S45 are added to the flowchart.

In the second embodiment, first, processing such as displaying a common setting screen and making common settings is performed as in the first embodiment.

More specifically, determination processing in step S43 is performed after step S42 as illustrated in FIG. 17. In step S43, whether the setting screen (transition destination screen) to be displayed next is a "common setting screen" or an "individual setting screen" is determined on the basis of, for example, the screen data table 200. The "individual setting screen" is a screen for setting "individual setting items."

When the next setting screen (transition destination screen) is determined as a common setting screen, the common setting screen is generated (step S44) and transferred to the mobile terminal 50 (step S46) as in the first embodiment described above. When the current setting screen is determined as an individual setting screen, the individual setting screen is generated (step S45) and transferred to the mobile terminal 50 (step S46), as will be described later.

When information such as the setting information regarding the user operation provided through the common setting screen is transmitted from the mobile terminal 50 to the parent apparatus 10*a* and "YES" is selected in step S35, the procedure proceeds to step S36 (see FIG. 17). In step S36, the parent apparatus 10*a* determines whether the current setting screen (setting screen that is currently being displayed on the mobile terminal 50 (and the parent apparatus 10*a*)) is a "common setting screen" or an "individual setting screen." When the current setting screen is determined as a common setting screen, registration processing that is the same as the registration processing performed in the common setting processing in the first embodiment described above is performed (step S51). When the current setting screen is determined as an individual setting screen, processing in step S53 is performed, which will be described later.

In the second embodiment, it is assumed that individual setting processing is performed after the common setting processing is performed as in the first embodiment.

More specifically, the mobile terminal 5 accepts a transition instruction from a certain screen (step S47) and then transmits the transition instruction (operation information) to the parent apparatus 10*a*. The parent apparatus 10*a* analyzes the operation information received from the mobile terminal 50 (step S32), and when the instruction is determined as a screen transition instruction, the procedure proceeds to step S42.

In step S42, the parent apparatus 10*a* determines the next transition destination screen as an "individual setting screen" on the basis of, for example, the screen data table 200 (see FIG. 4).

Here, "individual setting items" are setting items that are set to different settings in the MFPs 10. For example, when fixed IP addresses (static local IP addresses) are allocated to the MFPs 10, each IP address is an inherent value, and the setting value of the IP address of each MFP 10 is a value (individual setting value) that is set individually. In other words, the "IP address" is an individual setting item, and the screen for setting the "IP address" is an individual setting screen.

The parent apparatus 10*a* then proceeds the procedure from step S43 to step S45 on the basis of the fact that the transition destination screen is an individual setting screen, and generates the individual setting screen. For example, the parent apparatus 10*a* generates a new screen that is based on the screen for setting the IP address of the parent apparatus 10*a* (setting screen stored in the parent apparatus 10*a*) as an individual setting screen.

Figure 21:
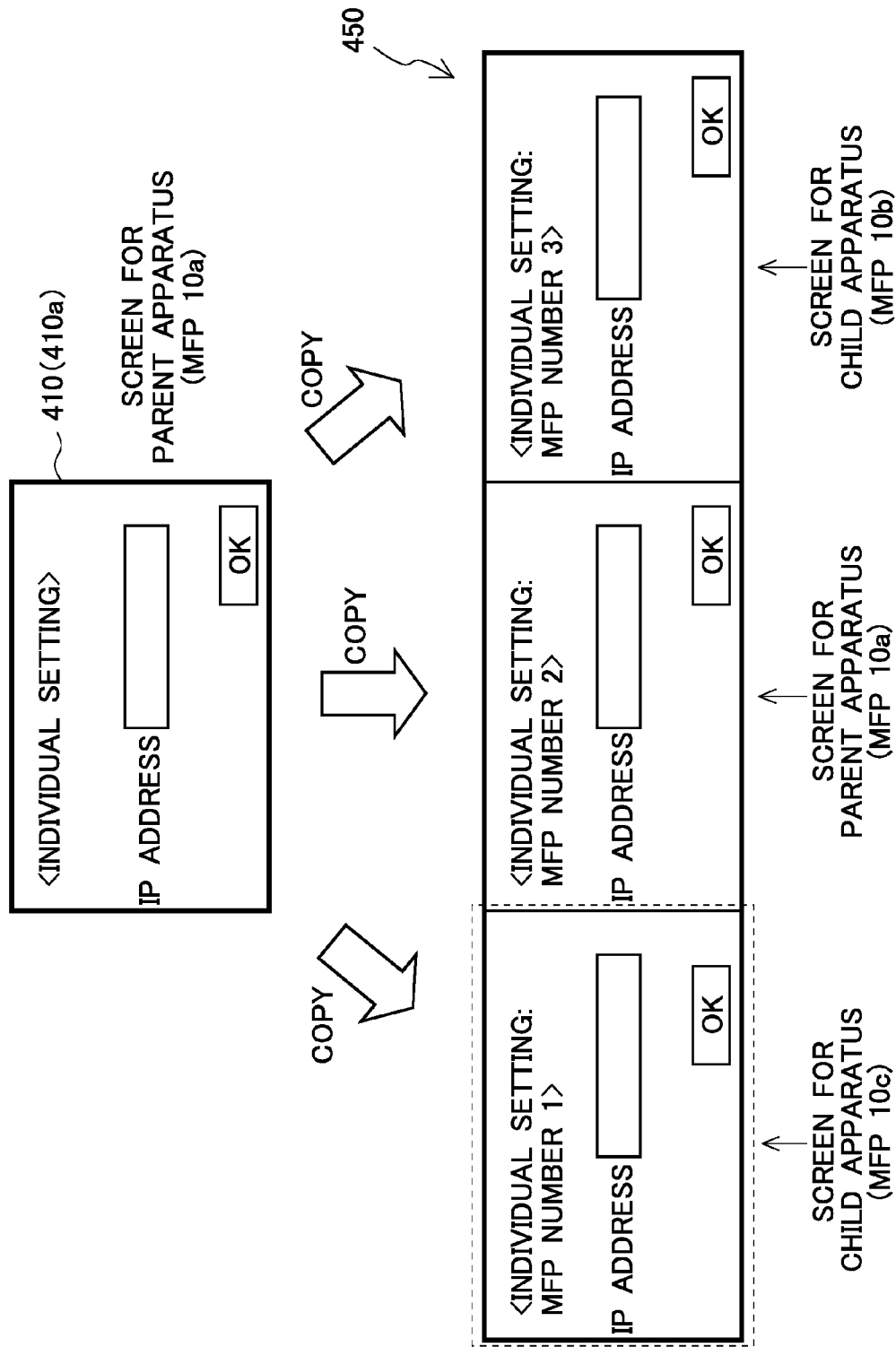
FIG. 21 is a conceptual diagram illustrating generation of an individual setting screen.

To be more specific, as illustrated in FIG. 21, the parent apparatus 10*a* generates three images (pre-composition images) by copying an IP-address setting screen 410 (410*a*) stored in the storage unit 5 of the own apparatus 10*a*. The three images preferably describe (display) information that indicates which image (screen) corresponds to which MFP (e.g., "MFP Number 1"). The parent apparatus 10*a* then arranges and combines those three images in the horizontal direction to generate a new screen 450 as an individual setting screen. FIG. 21 is a conceptual diagram illustrating the generation of the individual setting screen 450 (450*a*). It is assumed here that the setting of the "body number" (Number) is performed prior to the setting of the "IP address." The "body number" may also be registered as an "individual setting item."

In this way, the parent apparatus 10*a* generates a plurality of images, the number of which corresponds to the number of the MFPs 10, by copying the setting screen (setting screen regarding individual setting items) of the parent apparatus 10*a*, and arranges and combines those images in a predetermined direction to generate a new screen (individual setting screen) 450.

The parent apparatus 10*a* then transmits the individual setting screen 450 (to be specific, image data compressed in a predetermined format) to the mobile terminal 50 (step S46). In other words, the parent apparatus 10*a* transmits the individual setting screen 450 as an operation screen of the mobile terminal 50 to the mobile terminal 50.

Figure 19:
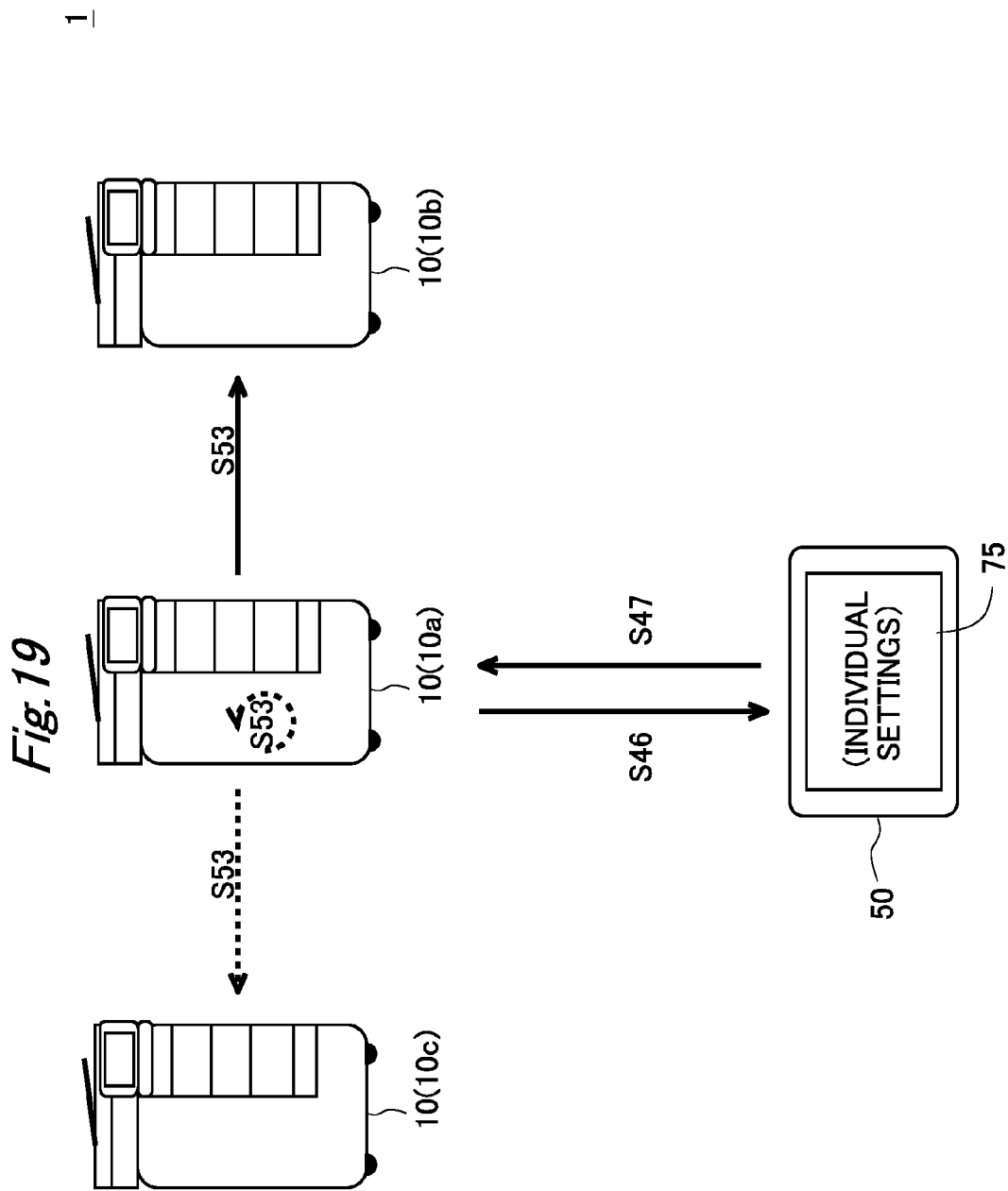
FIG. 19 is a conceptual diagram illustrating a setting operation using an individual setting screen.
Figure 20:
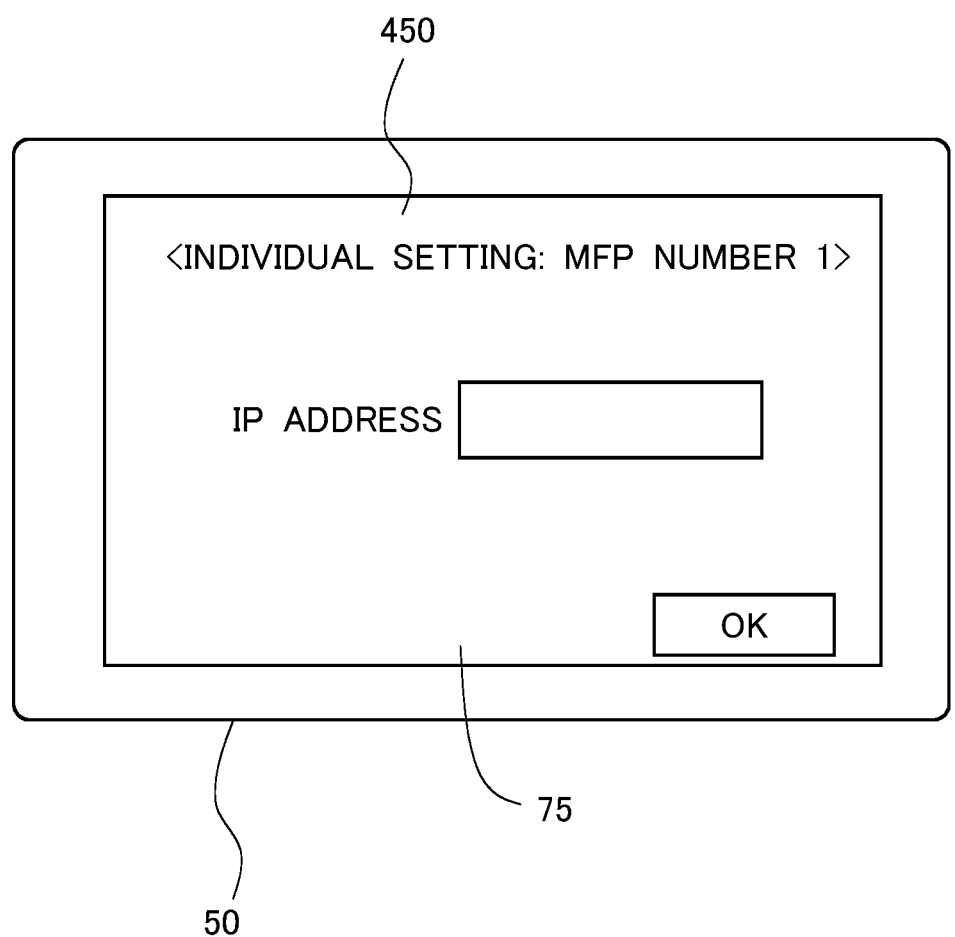
FIG. 20 illustrates an individual setting screen.

When the individual setting screen 450 (to be more specific, image data of the individual setting screen) is received from the parent apparatus 10*a*, the mobile terminal 50 determines that a screen transition instruction has been accepted (step S48) (see also FIG. 6) and displays the individual setting screen 450 received from the parent apparatus 10a on the touch panel 75 (step S46) (see also FIGS. 17 to 19). It is noted that the parent apparatus 10a displays only a partial region (partial range of a predetermined size) of the individual setting screen 450 at an increased size on the touch panel 75. To be more specific, the mobile terminal 50 displays an image of a size that corresponds to one of the three images included in the individual setting screen 450, on the entire touch panel 75. For example, as illustrated in FIGS. 20 and 21, only a region (indicated by the broken line in FIG. 21) that corresponds to the leftmost pre-composition image on the individual setting screen 450 is displayed (at an increased size) as a display target region (display target range) on the touch panel 75. The mobile terminal 50 then stands by for a user operation to be provided through the individual setting screen (operation screen) 450.

It is assumed here that, in the real space, three MFPs 10 are arranged in the order of Number 1, Number 2, and Number 3 from the left as viewed from the operator.

The operator is able to change the display target region (and the setting target apparatus) with a flick operation. For example, the display target region on the individual setting screen 450 may be changed (moved) from the currently displayed partial region to a relatively right-side partial region by flicking the screen from right to left. This enables the operator to select an apparatus that is targeted for settings. For example, in the case where the pre-composition image in the center is displayed on the entire touch panel 75, instead of the leftmost pre-composition image, the operator is able to perform the operation of setting the IP address of MFP Number 2 (here, MFP 10a).

When the operator performs the operation (user operation) of inputting the IP address, the mobile terminal 50 accepts this input operation. The mobile terminal 50 then transmits the first setting information according to the user operation (e.g., coordinate information (coordinate values of the setting item) regarding the position (touched position) of the operation of pressing that designates one of the multiple setting items included in the three images, and an input value for setting (setting input value)) to the parent apparatus 10a (step S47). At this time, the coordinate information may be represented as the coordinate value on a relative coordinate system that uses a reference point (e.g., point on the upper left) on the individual setting screen 450 as an origin.

When the user operation information (first setting information) is received (step S31 in FIG. 17), the parent apparatus 10a analyzes the first setting information (received information) and determines (ascertains) the instruction content of the user operation.

According to the result of the analysis, the parent apparatus 10a performs branch processing in steps S33, S35, and S41. For example, when the analysis result indicates that the user operation is an operation of setting a setting item, "YES" is selected in step S35, and the procedure proceeds to step S36. When the determination processing in step S36 determines that the current setting screen is an "individual setting screen," the procedure proceeds to step S53.

In step S53, the parent apparatus 10a determines which of the MFPs 10 is subjected to the operation of setting by the user operation, on the basis of position information (information regarding the user operational position on the individual setting screen). In other words, a setting target apparatus is determined from among the MFPs 10, on the basis of the position information. For example, when the position information is determined as indicating a position on the setting screen for the rightmost apparatus, the rightmost apparatus (MFP 10b) is determined as a setting target apparatus, which is also a setting target child apparatus.

The parent apparatus 10a then generates the second setting information (information for setting the setting content) that is based on the first setting information, and transmits the second setting information to the setting target child apparatus (e.g., child apparatus 10b) to allow the setting target child apparatus to set a value that is inherent in the setting target child apparatus (see also FIG. 19). To be more specific, the parent apparatus 10a transmits the second setting information directly to the setting target child apparatus (e.g., child apparatus 10b) without going through the mobile terminal 50 (or in other words, via another route that is different from the route of communication in the remote operation mode between the parent apparatus 10a and the mobile terminal 50). The setting target child apparatus performs processing for setting the individual setting item, on the basis of the received second setting information.

For example, when the touch coordinates corresponding to the setting item and the setting input value of the setting item are received as the first setting information from the mobile terminal 50, the parent apparatus 10a generates the following setting information (second setting information). Specifically, the parent apparatus 10a adds the screen ID of the individual setting screen regarding the concerned individual setting item to the screen, and generates, as the second setting information, information in which the "touch coordinates" corresponding to the setting item on the individual setting screen are converted into the "item ID of the setting item." That is, the parent apparatus 10a generates, as the second setting information, information that includes the screen ID of the individual setting screen for the individual setting item, the item ID of the setting item, and the setting input value of the setting item. Then, the parent apparatus 10a transmits this second setting information to the setting target child apparatus (e.g., 10b).

The setting target child apparatus (e.g., 10b) sets to the individual setting item of the own child apparatus 10b to the setting content that is based on the second setting information received from the parent apparatus 10a. More specifically, the child apparatus 10b sets the individual setting item ("IP address") to the setting content (e.g., "192.168.20.3") that is based on the input content designated by the user individually for each setting target apparatus. The processing for setting individual setting items is performed in this way, and individual content of the individual setting items is registered in each of the MFPs 10 (10a, 10b, 10c).

After this, the operation of setting individual setting items may also be performed in the same manner on another child apparatus 10c. For example, the mobile terminal 50 changes the display target region on the individual setting screen 450 in response to a flick operation by the user. Along with the change of the display target region, the leftmost input field (input field of the IP-address setting item for MFP Number 1) on the individual setting screen 450 is displayed, and in this state, the user inputs a setting input value to the input field. Then, setting information according to the user operation is transmitted via the parent apparatus 10a to the child apparatus 10c, and the child apparatus 10c performs setting processing. For example, the child apparatus 10c may set the individual setting item ("IP address") to setting content (e.g., "192.168.20.1") that is based on the input content designated by the user individually for the child apparatus 10c.

Similarly, the operation of setting individual setting items may also be performed in the same manner on another apparatus 10a (parent apparatus 10a). As to the individual setting items of the parent apparatus 10a, setting content that is based on the first setting information is registered in the parent apparatus 10a. For example, the parent apparatus 10a sets the individual setting item ("IP address") to setting content (e.g., "192.168.20.2") that is based on the input content designated by the user individually for the parent apparatus 10a.

In this way, the individual content of a certain individual setting item is registered in each of the MFPs 10 (10a, 10b, 10c). Note that the processing of the parent apparatus 10a again returns to step S31.

Thereafter, when the operator has pressed the OK button on the individual setting screen, the mobile terminal 50 accepts the user operation and transmits operation information (e.g., touch coordinates) to the parent apparatus 10a (step S47).

The parent apparatus 10a receives and analyzes the operation information (steps S31 and S32) The parent apparatus 10a determines that the user operation is a press of the OK button and provides a screen transition instruction, and the procedure proceeds via step S41 to step S42.

In step S42, the parent apparatus 10a determines the next transition destination screen on the basis of, for example, the screen data table 200 (see FIG. 4). For example, a screen (individual setting screen) for setting another "individual setting item" is determined as the next transition destination screen. The parent apparatus 10a then generates the individual setting screen (to be more specific, image data compressed in a predetermined format) (step S44), and transmits the individual setting screen to the mobile terminal 50 (step S46).

From then on, the same operations are repeatedly performed.

The operations as described above enable the user to set not only the common setting items but also the individual setting items of an arbitrary MFP 10 among the plurality of MFPs within a period during which the mobile terminal 50 and the parent apparatus 10a are remotely connected to each other. To be more specific, when the operation screen (setting screen) is determined as an individual setting screen (step S53), the setting information (second setting information) that is based on the information (first setting information) received from the mobile terminal 50 is transmitted from the parent apparatus 10a to the setting target child apparatus.

In this way, the mobile terminal 50 is capable of transmitting setting information regarding individual setting items via the parent apparatus 10a to, for example, the child apparatus 10b and making settings on the child apparatus 10b through the communication between the mobile terminal 50 and the parent apparatus 10a and the communication between the parent apparatus 10a and each of the child apparatuses 10b and 10c. In other words, the mobile terminal 50 is capable of setting the individual setting items of the other child apparatuses while the remote panel connection is established with only the parent apparatus 10a (without disconnecting the remote panel connection). That is, the communication connection with the parent apparatus 10a in the remote operation mode is also usable for setting processing on a specific child apparatus. This eliminates the need to reestablish remote connection between the mobile terminal 50 and the other child apparatuses (child MFPs) to set the individual setting items of the child apparatuses, thus extremely facilitating operations. In short, the mobile terminal 50 is capable of more easily performing setting processing on the MFPs 10 through the operation screens of the MFPs 10.

While the first embodiment illustrates a mode in which only "common setting" is performed and the second embodiment illustrates a mode in which both "common setting" and "individual setting" are performed, the present invention is not limited to these examples. For example, only "individual setting" may be performed.

3. Third Embodiment

The second embodiment described above illustrates a mode in which the display target region on the individual setting screen 450 is changed according to a flick operation provided to the mobile terminal 50 by the user. A third embodiment illustrates a mode in which the mobile terminal 50 acquires a positional relationship with the multiple MFPs 10, and the display target region on the individual setting screen 450 is automatically changed on the basis of a relationship between the direction of the line of sight of the operator of the mobile terminal 50 and the directions of the MFPs 10 as viewed from the current location of the mobile terminal 50.

Figure 22:
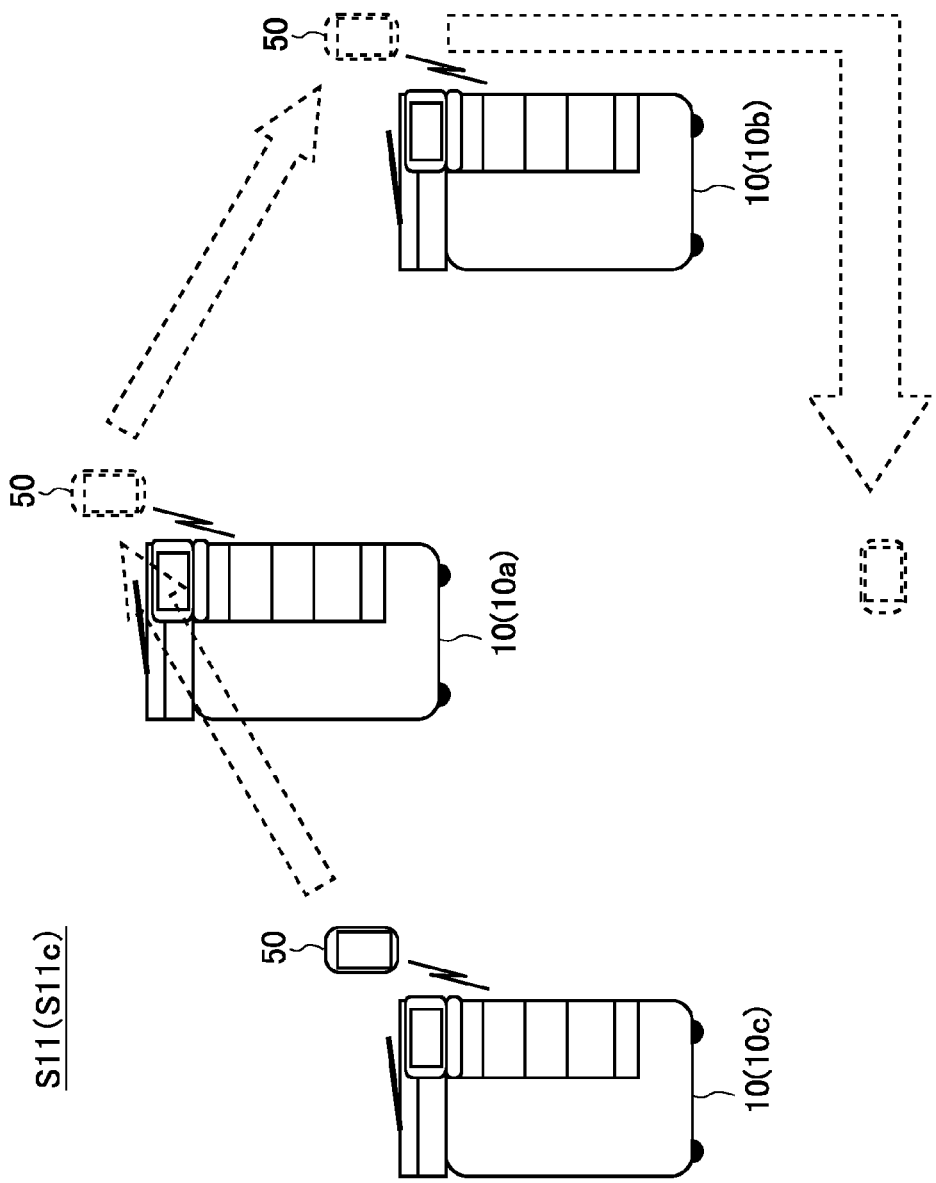
FIG. 22 is a conceptual diagram illustrating processing for acquiring apparatus information and position information regarding multiple MFPs.

As illustrated in FIG. 22, as in the first embodiment, the mobile terminal 50 sequentially establishes individual short-distance wireless with each of the MFPs 10, along with the travel of the user in step S11 (S11c). At this time, the mobile terminal 50 detects the distance and direction of travel from the MFPs 10, using sensors such as the azimuth detection sensor 57a and the acceleration sensor 57b. To be more specific, the mobile terminal 50 acquires apparatus information regarding each MFP 10 through the short-distance wireless communication and recognizes the position at which the apparatus information has been acquired through the short-distance wireless communication, as the installation location of the MFP 10 (see P1 to P3 in FIG. 23). The mobile terminal 50 also detects, with various types of sensors, the distance and direction of travel of the user (and the mobile terminal 50) when traveling from the installation location of a certain apparatus (where short-distance wireless connection is successively established) to the installation location of the next apparatus. The mobile terminal 50 also acquires position information (relative positional relationship of the MFPs 10) regarding the installation locations of the MFPs 10 by using the detected distance and direction of travel. The mobile terminal 50 also detects, with various types of sensors, the distance and direction of travel from the installation location of one of the MFPs 10 (e.g., position P3 in FIG. 23) to the current operational position of the mobile terminal 50 (e.g., position P0 in FIG. 23). The mobile terminal 50 then acquires the relative positional relationship between the current operational position and the location of each of the MFPs 10 by using the detected distance and direction of travel.

Figure 23:
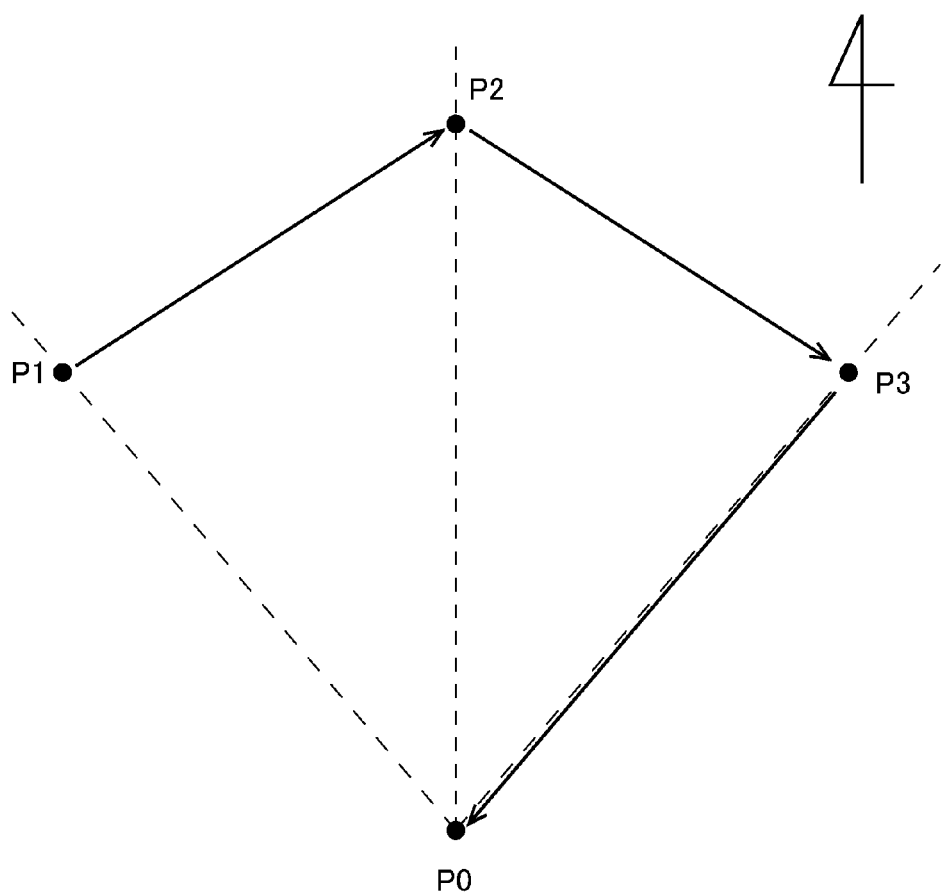
FIG. 23 illustrates the position information (map information).

FIG. 23 illustrates position information (map information) acquired in the way described above. The mobile terminal 50 is capable of acquiring, for example, position information like this map information, specifically, the relative positional relationship between the current location P0 of the mobile terminal 50 and each of the locations P1, P2, and P3 of the MFP 10c, 10a, and 10b.

Figure 24:
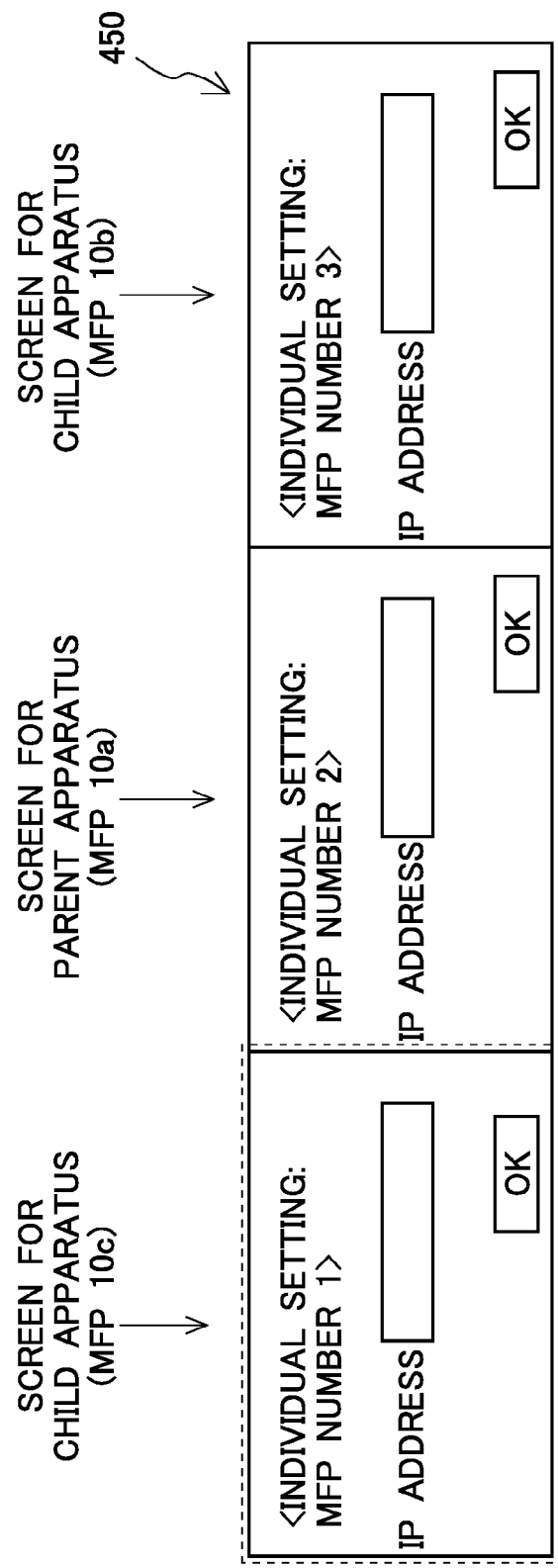
FIG. 24 illustrates a condition in which a partial region of an individual setting screen is displayed.

In the third embodiment, this relative positional relationship is also used in step S45 to generate the individual setting screen 450 (450c). More specifically, three images are arranged in the order of arrangement as viewed from the mobile terminal 50, as illustrated in FIG. 24. To be more specific, a pre-composition image that corresponds to the leftmost MFP 10c of the three MFPs 103 is arranged on the leftmost side of the individual setting screen 450c, and a pre-composition image that corresponds to the rightmost MFP 10*b* is arranged on the rightmost side of the individual setting screen 450*c*. A pre-composition image that corresponds to the MFP 10*a* in the center is arranged in the center of the individual setting screen 450*c*.

The three images (multiple images, the number of which corresponds to the number of MFPs 10) are generated by copying the setting screen (screen for setting an individual setting item) of the parent apparatus 10*a*, and arranged and combined in a predetermined direction to generate the individual setting screen 450*c*.

In step S46, the mobile terminal 50 changes (moves) the display target region on the individual setting screen 450*c* according to the direction of the line of sight of the operator of the mobile terminal 50.

More specifically, the mobile terminal 50 first measures the orientation of the mobile terminal 50 (to be more specific, azimuth indicated by a vector that is drawn from the lower end to the upper end along the left side (or right side) of (the display screen of) the touch panel 75) with the azimuth detection sensor 57*a*. The orientation of the mobile terminal 50 is recognized as indicating the direction of the line of sight of the operator of the mobile terminal 50. The mobile terminal 50 also acquires the directions of the MFPs 10 (directions corresponding to the installation locations of the MFPs) as viewed from the current location of the mobile terminal on the basis of the aforementioned map information and the orientation of the mobile terminal 50.

The mobile terminal 50 then changes the display target region on the individual setting screen 450 on the basis of the direction of the line of sight of the operator (orientation of the mobile terminal 50) and the directions (azimuths) corresponding to the installation locations of the MFPs 10.

Figure 25:
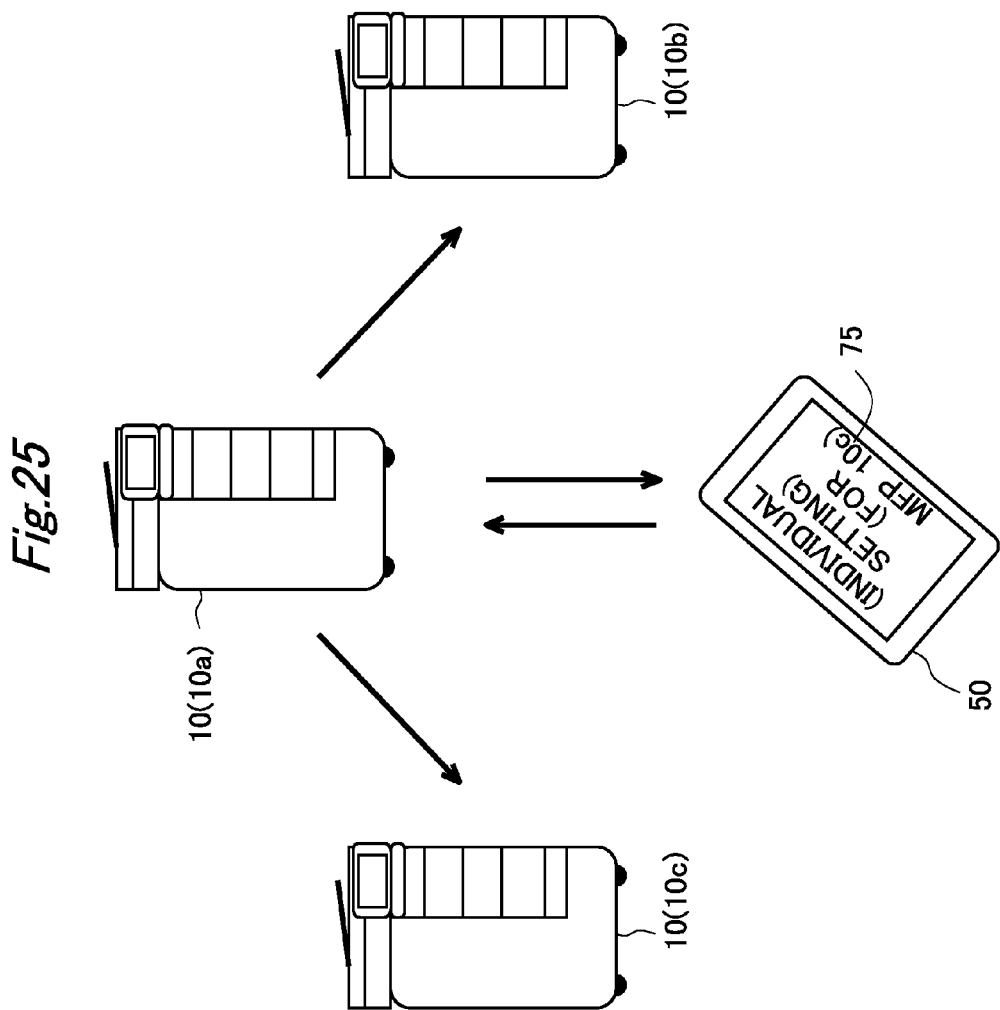
FIG. 25 illustrates that a mobile terminal mostly faces the leftmost MFP.

To be more specific, when the mobile terminal 50 is oriented to the azimuth (e.g., northwest) that corresponds to the installation location P1 (FIG. 23) of the MFP 10*c* (see also FIG. 25), the mobile terminal 50 displays the setting screen for the MFP 10*c* (leftmost one-third region of the individual setting screen 450) on the touch panel 75 (see FIG. 24). In FIG. 24, the display target region on the touch panel 75 is indicated by the broken line.

Figure 26:
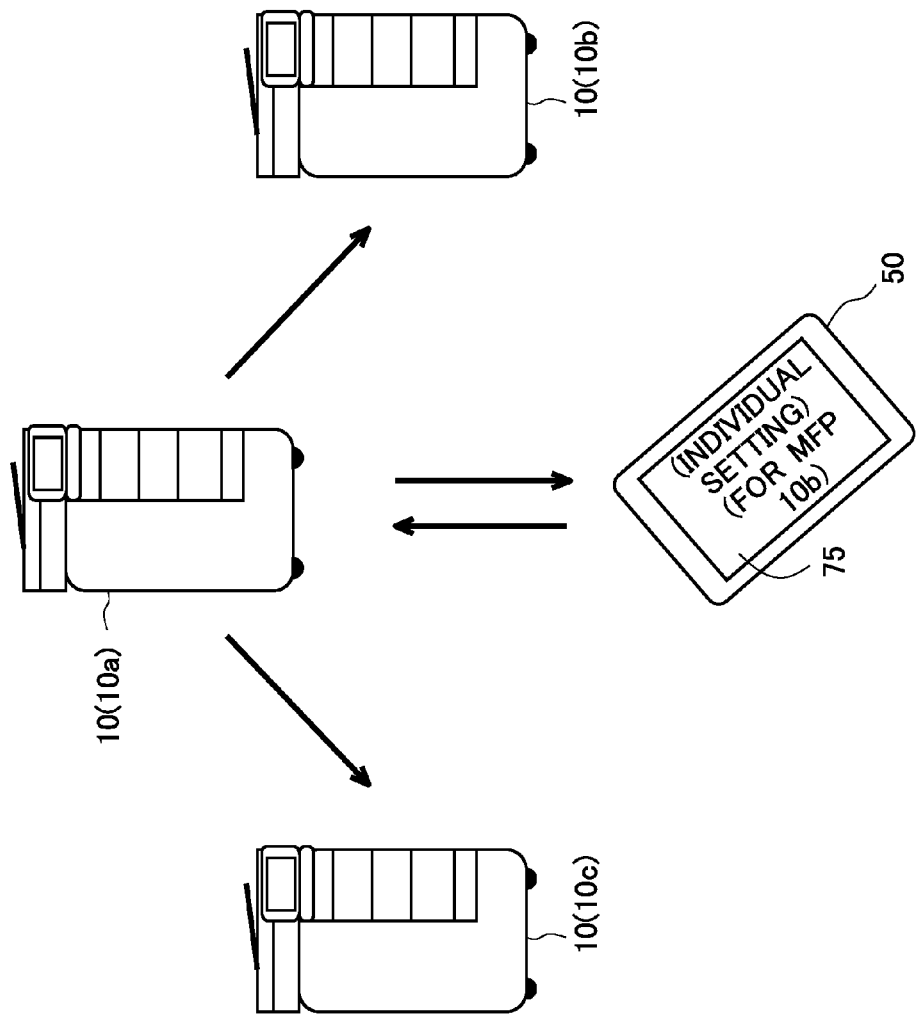
FIG. 26 illustrates that a mobile terminal mostly faces the rightmost MFP.
Figure 27:
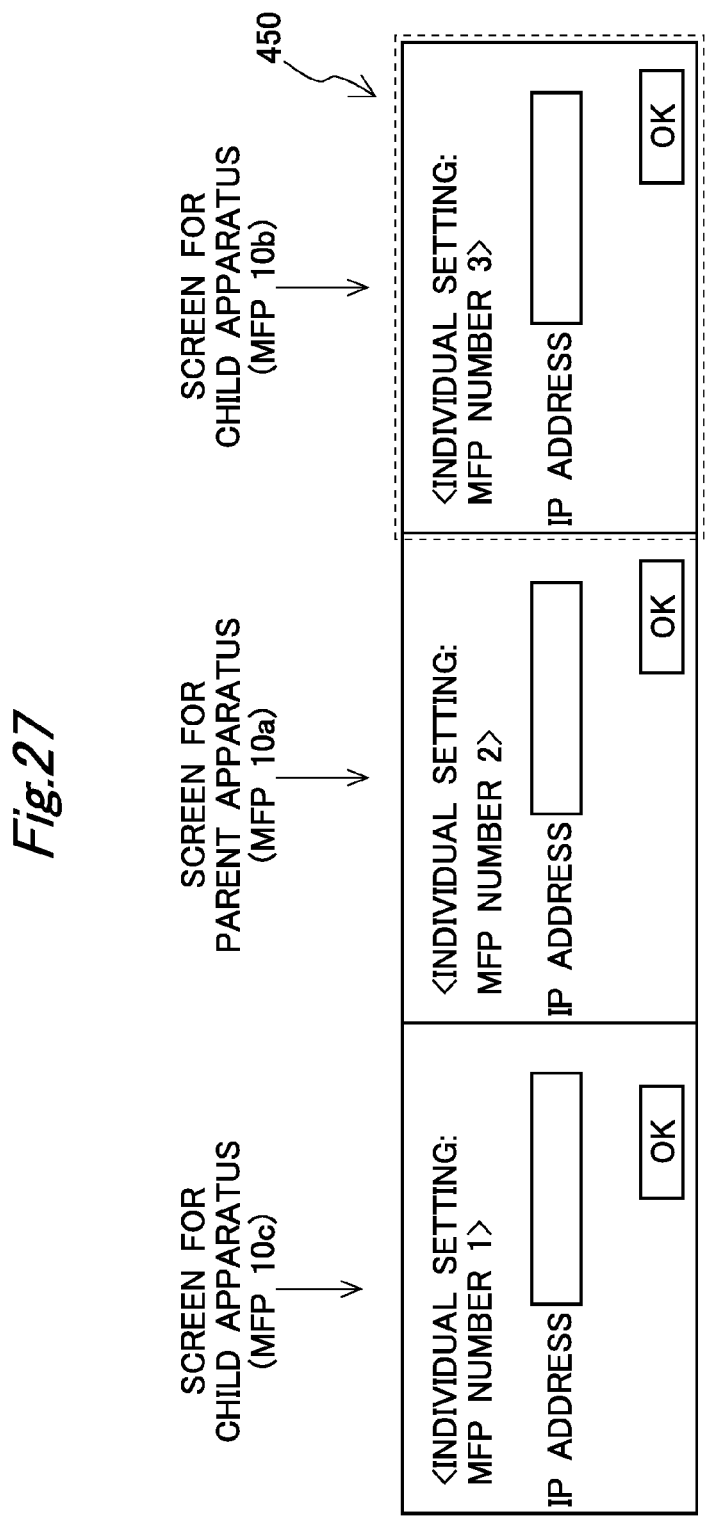
FIG. 27 illustrates a condition in which another partial region of the individual setting screen is displayed.

When the mobile terminal 50 is oriented to the azimuth that corresponds to the installation location P3 of the MFP 10*b* (FIG. 23) (see also FIG. 26), the mobile terminal 50 displays the setting screen for the MFP 10*b* (rightmost one-third region of the individual setting screen 450) on the touch panel 75 as illustrated in FIG. 27. In FIG. 27, the display target region on the touch panel 75 is also indicated by the broken line.

Figure 28:
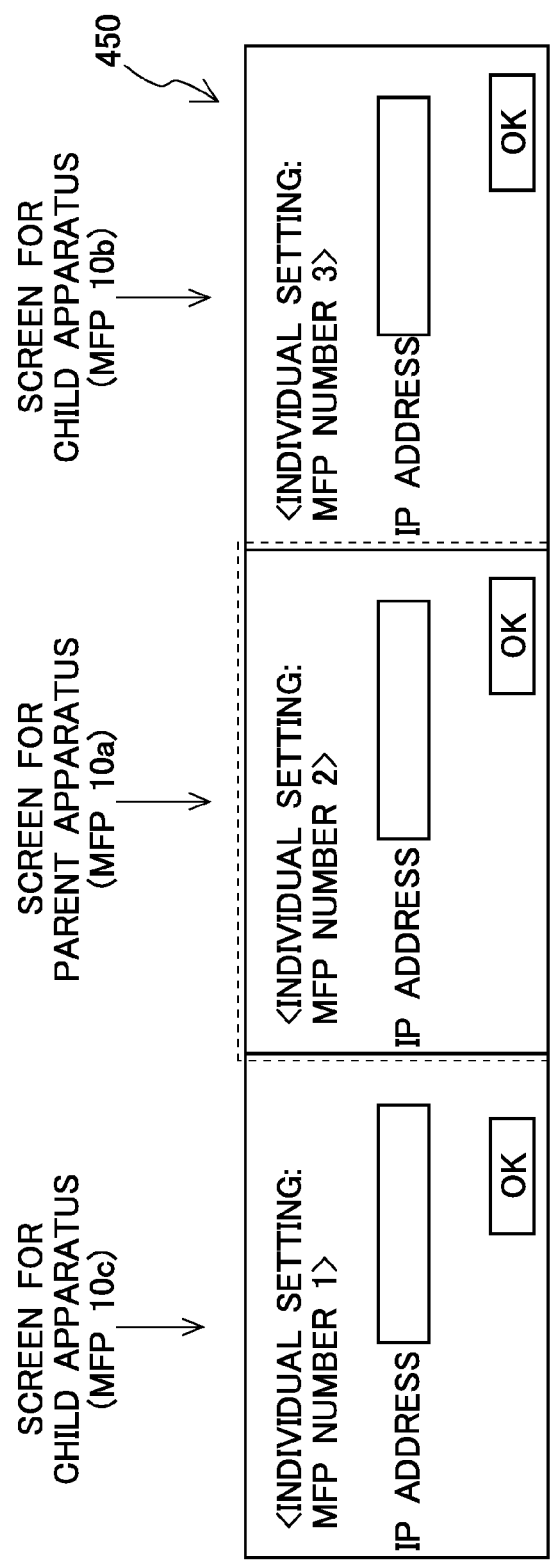
FIG. 28 illustrate that a mobile terminal mostly faces the MFP in the center.

Similarly, when the mobile terminal 50 is oriented to the azimuth that corresponds to the installation location P2 of the MFP 10*a* (FIG. 23), the mobile terminal 50 displays the setting screen for the MFP 10*b* as illustrated in FIG. 28. In FIG. 28, the display target region on the touch panel 75 is also indicated by the broken line.

When the mobile terminal 50 is oriented to the azimuth that corresponds to an intermediate position between two MFPs 10, the mobile terminal 50 displays a range that spans the setting screens for the two MFPs on the touch panel 75. For example, when the mobile terminal 50 is oriented to the azimuth (e.g., north-northwest) that corresponds to an intermediate position between the two MFPs 10*c* and 10*a*, the mobile terminal 50 displays a range that spans the right half region of the setting screen for the MFP 10*c* and the left-half region of the setting screen for the MFP 10*a* on the touch panel 75. The present invention is, however, not limited to this example, and only the setting screen for a MFP that is located at an azimuth (direction) closest to the azimuth to which the mobile terminal 50 is orientated among the MFPs 10 may be selectively displayed.

As described above, the display target region on the individual setting screen 450 is automatically changed according to the orientation of the mobile terminal 50, and a partial region (partial range) that corresponds to the changed display target region is displayed on the touch panel 75.

Although, in the second and third embodiments, the individual setting screen 450 is generated from three copies of the setting screen (setting screen corresponding to the individual setting item) stored in the parent apparatus 10*a*, the present invention is not limited to this example.

For example, in the second and third embodiments, a request to transmit setting screens (setting screens corresponding to the individual setting item) stored in the child apparatuses 10*b* and 10*c* to the parent apparatus 10*a* may be transmitted to the child apparatuses 10*b* and 10*c*. Then, two setting screens (setting screens for the child apparatuses 10*b* and 10*c*) returned in response to the request and the setting screen (setting screen corresponding to the individual setting item) stored in the parent apparatus 10*a* may be combined to generate the individual setting screen 450.

Alternatively, in the second and third embodiments, when the parent apparatus 10*a* also stores the setting screens for the child apparatuses 10*b* and 10*c* in advance, the three images (three setting screens for the apparatuses 10*a*, 10*b*, and 10*c*) stored in the parent apparatus 10*a* may be combined to generate the individual setting screen 450.

4. Fourth Embodiment

Although, in the second and third embodiments described above, the individual setting screen (composite image obtained by arranging and combining three pre-composition images side by side) 450 as illustrated in FIG. 21 is generated in step S45 (FIG. 17), the present invention is not limited to this example. For example, an individual setting screen (composite image of a certain setting screen and "tabs" for switching) 450 (450*b*) as illustrated in FIG. 29 may be generated in step S45. In short, the individual setting screen may be generated in tab form. A fourth embodiment describes such a variation. The following description mainly focuses on differences from the second embodiment.

In the fourth embodiment, the setting screen (screen for setting an individual setting item) for the parent apparatus 10*a* stored in the parent apparatus 10*a* and a plurality of tab images are combined to generate an individual setting screen 450*b* (451) (FIG. 29) in step S45. The tab images are rectangular part images, each forming a "tab," and given tab names (e.g., "Number 1," "Number 2"). The individual setting screen 450*b* is generated by combining the setting screen for the parent apparatus 10*a* (also referred to as a "parent-apparatus setting screen"), which is a screen for setting an individual setting item and being stored in the parent apparatus 10*a*, and a plurality of tab images. On the individual setting screen 451, the tab image for "Number 1" is displayed at the front. This indicates that the setting of "Number 1" is active.

The individual setting screen 450*b* (451) is transmitted from the parent apparatus 10*a* to the mobile terminal 50 and displayed on the touch panel 75 (step S46).

Operations of pressing these tab images are taken as operations of instructing switching of the setting screens.

For example, when the tab for "Number 2" is selected on the individual setting screen 450*b*, an individual setting screen 452 (FIG. 30) for "Number 2" (MFP 10a) is displayed in front, instead of the individual setting screen 451 (FIG. 29) for "Number 1" (MFP 10c), as illustrated in FIG. 30.

More specifically, position information that includes the operational position (pressed position) in the operation of pressing the tab image is transmitted from the mobile terminal 50 to the parent apparatus 10a, and the parent apparatus 10a determines a new setting target apparatus (here, "Number 2") on the basis of the operational position. The parent apparatus 10a identifies the tab image that corresponds to the press operation by the user from among the tab images on the basis of the operational position, and identifies the apparatus that corresponds to the identified tab image as a setting target apparatus. The parent apparatus 10a then generates an updated (post-tab-switching) individual setting screen 452 that corresponds to the new setting target apparatus (here, parent apparatus 10a). The individual setting screen 452 is generated by combining the parent-apparatus setting screen and multiple tab images. On the individual setting screen 452, the tab image for "Number 2" is displayed in front.

The parent apparatus 10a transmits the individual setting screen 452 to the mobile terminal 50, and the mobile terminal 50 displays the individual setting screen 452 on the touch panel 75. In this way, processing for switching the tabs is performed on the setting screen.

Figure 31:
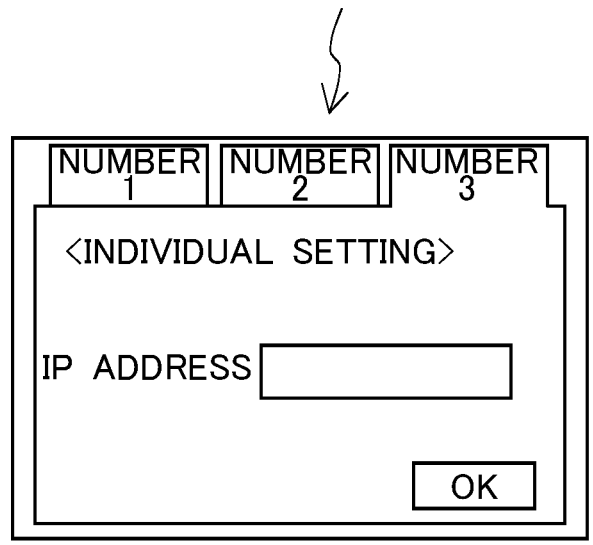
FIG. 31 illustrates an individual setting screen for Number 3.

Similarly, when the tab for "Number 3" is selected on the individual setting screen 450b, an individual setting screen 453 for "Number 3" (MFP 10b) is displayed this time at the front as illustrated in FIG. 31. Such switching processing is also performed along with the processing of communication between the mobile terminal 50 and the parent apparatus 10a and the processing of communication between the parent apparatus 10a and the child apparatus 10c.

More specifically, position information that includes the operational position (pressed position) in the operation of pressing the tab image is transmitted from the mobile terminal 50 to the parent apparatus 10a, and the parent apparatus 10a determines a new setting target apparatus ("Number 3") on the basis of the operational position. Here, the child apparatus 10c is determined as a new setting target apparatus (also referred to as a "setting target child apparatus"). The parent apparatus 10a then generates the updated (post-tab-switching) individual setting screen 453 that corresponds to the new setting target apparatus. The individual setting screen 453 is generated by combining the parent-apparatus setting screen and multiple tab images. On the individual setting screen 453, the tab image for "Number 3" is displayed in front.

In this way, when the tab switching operation is performed on the individual setting screen 450b, the parent apparatus 10a receives from the mobile terminal 50 position information that includes the operational position in the operation of pressing multiple tab images. The parent apparatus 10a also determines a setting target child apparatus from among the MFPs 10 on the basis of the position information. In other words, the parent apparatus 10a determines for which apparatus the screen is to be displayed on the mobile terminal 50.

After this, when the OK button is further pressed, the parent apparatus 10a transmits second setting information to the setting target apparatus (parent or child apparatus targeted for setting) in step S53 (FIG. 17).

Similar effects to those of the second embodiment are also achieved with this mode.

5. Fifth Embodiment

A fifth embodiment is a variation of the fourth embodiment.

In the fourth embodiment, individual setting screens are switched according to the operation (manual operation) of switching "tabs" that are displayed on the tab-form individual setting screen.

The fifth embodiment illustrates a mode in which an individual setting screen is automatically changed according to the direction of the line of sight of the operator of the mobile terminal 50 (orientation of the mobile terminal 50) during display of the tab-form individual setting screen as in the third embodiment.

More specifically, the mobile terminal 50 generates map information as in the third embodiment. The mobile terminal 50 then identifies a setting target child apparatus from among the MFPs 10 on the basis of the relationship between the direction of the line of sight of the operator of the mobile terminal 50 and the directions of the MFPs 10 as viewed from the current location of the mobile terminal 50. Then, a setting screen for the setting target child apparatus is displayed as an operation screen on the touch panel 75 of the mobile terminal 50.

For example, in step S45, a MFP 10 that is located at an azimuth (direction) that is closest to the azimuth of the line of sight of the operator of the mobile terminal 50 is determined as a setting target apparatus. Then, an individual setting screen 450 (one of 451 to 453) for the setting target apparatuses is generated. In the fifth embodiment, the relative positional relationship of the three MFPs 10 is also used to generate the individual setting screen 450 (451 to 453). More specifically, three tab images are arranged in the order of arrangement as viewed from the operator of the mobile terminal 50. To be more specific, the tab image that corresponds to the leftmost MFP 10c among the three MFPs 10 is arranged on the leftmost side, and the tab image that corresponds to the rightmost MFP 10b is arranged on the rightmost side. The tab image that corresponds to the MFP 10a in the center is arranged in the center.

Each individual setting screen (tab-form individual setting screen) 450b (451 to 453) is generated by combining the setting screen (screen for setting an individual setting item) for the parent apparatus 10a and multiple tab images arranged in the order described above.

The parent apparatus 10a then transmits the tab-form individual setting screen 450b (e.g., 451) to the mobile terminal 50.

The mobile terminal 50 displays the received setting screen (updated setting screen) on the touch panel 75.

The parent apparatus 10a also accepts a display update instruction (instruction to change the setting target apparatus) that is automatically transmitted from the mobile terminal 50, during display of the operation screen (tab-form individual setting screen) on the mobile terminal 50.

More specifically, the mobile terminal 50 determines which of the individual setting screens 451 to 453 is to be displayed, according to, for example, the direction of the line of sight of the operator of the mobile terminal 50 and the aforementioned map information during display of the operation screen. To be more specific, the mobile terminal 50 identifies a setting target apparatus from among the MFPs 10 on the basis of the relationship between the direction of the line of sight of the operator of the mobile terminal 50 and the directions of the MFPs 10 as viewed from the current location of the mobile terminal 50, and transmits the result of the identification along with a request to update the screen (display update instruction) to the parent apparatus 10*a*. In this way, the mobile terminal 50 is capable of transmitting not only the position information but also other information such as the request to update the screen to the parent apparatus 10*a* during display of the operation screen.

When the request to update the screen and the identification result, for example, are received, the parent apparatus 10*a* generates a setting screen (updated setting screen) for the setting target apparatuses designated according to the result of the identification. More specifically, the parent apparatus 10*a* generates, as the updated setting screen, a composite image that is obtained by combining the parent-apparatus setting screen and multiple tab images and in which the tag image that corresponds to the setting target apparatus among the tab images is displayed in front. On the updated setting screen (e.g., individual setting screen 453), three tab images are arranged in the same order as on the pre-update individual setting screen (e.g., 451) according to the order of arrangement of the three MFPs 10 as viewed from the operator of the mobile terminal 50. Here, the tab image (e.g., tab for "Number 3") that corresponds to the setting target apparatus is arranged at the front (see FIG. 31).

In this way, the MFP 10 that is located in the direction closest to the direction of the line of sight of the operator of the mobile terminal 50 is determined as the setting target apparatus, on the basis of the relationship between the direction of the line of sight of the operator of the mobile terminal 50 and the directions of the MFPs 10 as viewed from the current location of the mobile terminal 50. Then, the individual setting screen for the setting target apparatus is displayed as an operation screen on the touch panel 75 of the mobile terminal 50.

Similar effects to those of the third embodiment are also achieved with this mode.

In the fourth and fifth embodiments, the individual setting screens 451 to 453 are generated by using the setting screen (screen for setting an individual setting item) stored in the parent apparatus 10*a*. More specifically, the individual setting screens are generated by combining the parent-apparatus setting screen and multiple tab images. The present invention is, however, not limited to this example.

For example, in the fourth and fifth embodiments, individual setting screens may be generated by combining a "child-apparatus setting screen" and multiple tab images. The "child-apparatus setting screen" is a setting operation screen for setting an individual item of the child apparatus (setting target child apparatus) and is a setting screen for the child apparatus stored in the child apparatus 10*b* (or 10*c*).

More specifically, when the setting target apparatus is identified by the mobile terminal 50 as in the fifth embodiment, information regarding the identified setting target apparatus (and a screen update request) is transmitted from the mobile terminal 50 to the parent apparatus 10*a*. When position information regarding the operation of pressing a tab image is transmitted from the mobile terminal 50 to the parent apparatus 10*a* as in the fourth embodiment, the parent apparatus 10*a* itself identifies the setting target apparatus.

Then, when it is determined that the setting target apparatus has been changed, the parent apparatus 10*a* determines that the individual setting screen to be displayed needs to be updated (the setting target apparatus needs to be changed) and performs the following operation.

First, the parent apparatus 10*a* requests the setting target child apparatus 10*b* (or 10*c*) to transmit a setting screen (setting screen corresponding to the individual setting item) stored in the setting target child apparatus to the parent apparatus 10*a*. When the setting screen for the setting target child apparatus (10*b*) is returned from the setting target child apparatus, the parent apparatus 10*a* combines the received setting screen (child-apparatus setting screen) and multiple tab images to generate an individual setting screen 450*b* (452).

The parent apparatus 10*a* then transmits the individual setting screen 450*b* to the mobile terminal 50, and the mobile terminal 50 displays the individual setting screen 450*b* (e.g., individual setting screen 453 for the child apparatus 10*b*) on the touch panel 75. After this, the setting operation performed on the individual setting screen 450*b* is accepted.

In this way, individual setting screens may be generated by combining a child-apparatus setting screen and multiple tab images.

Alternatively, in the fourth and fifth embodiments, when the parent apparatus 10*a* stores the setting screens for the child apparatuses 10*b* and 10*c* in advance, one of the three images (three setting screens for the apparatuses 10*a*, 10*b*, and 10*c*) stored in the parent apparatus 10*a* and tab images may be combined to generate one of the individual setting screens 451 to 453.

6. Variations

While the above has been a description of embodiments of the present invention, the present invention is limited to the modes described above.

Figure 32:
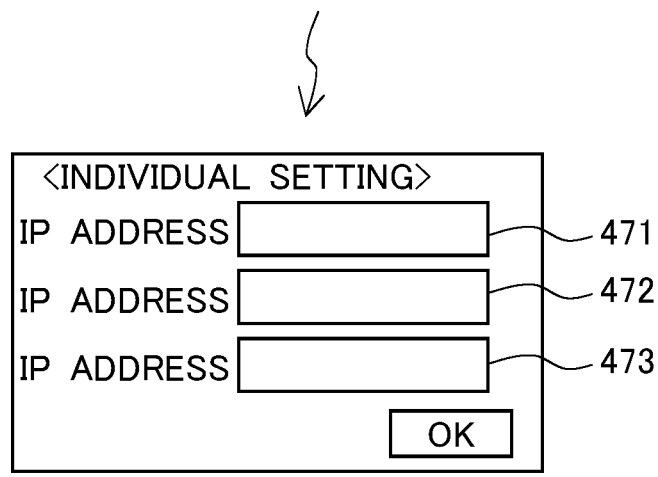
FIG. 32 illustrates an individual setting screen according to a variation.

For example, the individual setting screen 450 may be an individual setting screen 450*c* as illustrated in FIG. 32. The individual setting screen 450*c* is a screen in which input fields for an individual setting item (e.g., "IP address") are arranged, the number of the input fields corresponding to the number (e.g., three) of MFPs 10. Here, three input fields 471 to 473 (more specifically, an input field 471 for Number 1, an input field 472 for Number 2, and an input field 473 for Number 3 in order from above) are arranged in the up-down direction. The order of arrangement is not limited to this example, and the three input fields 471 to 473 may be arranged in the right-left direction. When this individual setting screen 450*c* is generated by the parent apparatus 10*a* and transmitted to the mobile terminal 50, the mobile terminal 50 displays the individual setting screen 450*c* on the touch panel 75. At this time, the touch panel 75 displays the entire individual setting screen 450*c* on approximately the entire range of the touch panel 75. In other words, the entire range of the individual setting screen 450*c* is displayed as a display target range. In this way, the individual setting screen 450*c* may be used.

Although, in the embodiments described above, the mobile terminal 50 determines a parent apparatus on the basis of the apparatus information regarding the image forming apparatuses, the present invention is not limited to this example. For example, the administrator (operator) may determine a specific MFP in advance as a parent apparatus.

In the embodiments described above, the mobile terminal 50 acquires the apparatus information regarding each MFP 10 by establishing short-distance wireless communication with the MFP 10 in step S11, and the parent apparatus 10*a* acquires this apparatus information as a result of the mobile terminal 50 transmitting the apparatus information (step S13). The present invention is, however, not limited to this example. For example, a configuration is possible in which the apparatus information regarding each of the MFPs 10 is stored in advance in the storage unit 5 of the parent apparatus 10a, and the parent apparatus 10a extracts and acquires the apparatus information from the storage unit 5. In this case, the parent apparatus 10a is capable of acquiring, for example, communication destination information regarding child apparatuses on the basis of the extracted apparatus information.

Note that the specific embodiments described above include the invention as follows:

(1) An image forming system includes a plurality of image forming apparatuses, and a mobile terminal. The mobile terminal includes a first communication unit that establishes communication connection in a remote operation mode with a parent apparatus that is one of the plurality of image forming apparatuses, the remote operation mode being a mode in which the mobile terminal operates as a remote operation apparatus of the parent apparatus, and an operation unit that, during the communication connection in the remote operation mode, displays an operation screen received from the parent apparatus and accepts a user operation provided to the operation screen. The first communication unit transmits first setting information that is based on the user operation to the parent apparatus. The parent apparatus includes a second communication unit that receives the first setting information from the mobile terminal, and a determination unit that determines a setting target child apparatus from among the plurality of image forming apparatuses, the setting target child apparatus being an apparatus other than the parent apparatus and being a child apparatus on which setting processing is to be performed on the basis of information received from the parent apparatus. The second communication unit transmits second setting information that is based on the first setting information from the parent apparatus to the setting target child apparatus, and the setting target child apparatus sets setting content that is based on the second setting information received from the parent apparatus in the setting target child apparatus.

(2) In the image forming system of (1), the parent apparatus further includes a setting unit that performs setting processing on the own apparatus. When a common setting screen is transmitted as the operation screen from the parent apparatus to the mobile terminal, the common setting screen being a screen for setting a common setting item that is to be set to common content in the plurality of image forming apparatuses, the setting unit sets setting content that is based on the first setting information in the parent apparatus, the second communication unit transmits the second setting information to the setting target child apparatus, and the setting target child apparatus sets the common setting item to the same content as the setting content set in the parent apparatus, on the basis of the second setting information received from the parent apparatus.

(3) In the image forming system of (2), the second communication unit transmits a screen for setting the common setting item, stored in the parent apparatus, as the common setting screen to the mobile terminal.

(4) In the image forming system of (1), when an individual setting screen is transmitted as the operation screen from the parent apparatus to the mobile terminal, the individual setting screen being a screen for setting an individual setting item that is to be set to individual content in each of the plurality of image forming apparatuses, the second communication unit transmits the second setting information to the setting target child apparatus, and the setting target child apparatus sets the individual setting item to setting content that is based on the second setting information received from the parent apparatus.

(5) In the image forming system of (4), the parent apparatus further includes a generation unit that generates a plurality of images, the number of which corresponds to the number of the plurality of image forming apparatuses, by copying a screen for setting the individual setting item, which is a setting screen for the parent apparatus, and generates the individual setting screen by arranging and combining the plurality of images in a predetermined direction. The operation unit displays a partial range of the individual setting screen as a display target range.

(6) In the image forming system of (5), the second communication unit receives position information regarding a user operation provided to the individual setting screen from the mobile terminal, and the determination unit determines the setting target child apparatus from among the plurality of image forming apparatuses on the basis of the position information.

(7) In the image forming system of (5), the mobile terminal further includes a display control unit that causes the operation unit to display the partial range of the individual setting screen at an increased size and that changes the partial range on the basis of a relationship between a direction of the line of sight of an operator of the mobile terminal and directions of the plurality of image forming apparatuses as viewed from a current location of the mobile terminal (8) In the image forming system of (4), the parent apparatus further includes a generation unit that generates the individual setting screen in which input fields for the individual setting item are arranged, the number of the input fields corresponding to the number of the plurality of image forming apparatuses. The operation unit displays the entire range of the individual setting screen as a display target range.

(9) In the image forming system of (4), the parent apparatus further includes a generation unit that generates the individual setting screen by combining a parent-apparatus setting screen and a plurality of tab images, the parent-apparatus setting screen being a setting screen for and stored in the parent apparatus and being a screen for setting the individual setting item.

(10) In the image forming system of (4), the parent apparatus further includes a generation unit that generates the individual setting screen by combining a child-apparatus setting screen and a plurality of tab images, the child-apparatus setting screen being a setting screen for and stored in the setting target child apparatus and being a screen for setting the individual setting item.

(11) In the image forming system of (10), the second communication unit transmits to the setting target child apparatus a request to transmit the child-apparatus setting screen and receives the child-apparatus setting screen from the setting target child apparatus, and the generation unit generates a composite image of the child-apparatus setting screen and the plurality of tab images as the individual setting screen.

(12) In the image forming system of (11), the second communication unit receives the first setting information that is based on a user operation provided to the individual setting screen from the parent apparatus and transmits second setting information that is based on the first setting information from the parent apparatus to the setting target child apparatus, and the setting target child apparatus sets the individual setting item to setting content that is based on the second setting information received from the parent apparatus.

(13) In the image forming system of one of (9) to (12), the second communication unit receives position information that includes an operational position in the plurality of tab images from the mobile terminal, and the determination unit determines the setting target child apparatus from among the plurality of image forming apparatuses on the basis of the position information.

(14) In the image forming system of one of (9) to (12), the mobile terminal further includes an identification unit that identifies a setting target apparatus from among the plurality of image forming apparatuses on the basis of a relationship between a direction of the line of sight of an operator of the mobile terminal and directions of the plurality of image forming apparatuses as viewed from a current location of the mobile terminal. The determination unit determines the setting target child apparatus on the basis of the content identified by the identification unit, and the second communication unit transmits the individual setting screen for the setting target child apparatus, identified by the identification unit, as the operation screen to the mobile terminal.

(15) In the image forming system of (7) or (14), the mobile terminal further includes an acquisition unit that, when individual short-distance wireless communication between the mobile terminal held by the user and each of the plurality of image forming apparatuses is sequentially established along with travel of a user, acquires a relative positional relationship of the plurality of image forming apparatuses by detecting a distance and direction of travel of the user between the plurality of image forming apparatuses with a sensor and acquires a relative position relationship between the current operational position and the position of each of the plurality of image forming apparatuses by detecting, with a sensor, a distance and direction of travel of the user when moving from an installation location of one of the plurality of image forming apparatuses to the current operational position of the mobile terminal.

(16) In the image forming system of (1), the parent apparatus further includes a determination unit that determines whether the operation screen to be displayed next is a common setting screen or an individual setting screen, the common setting screen being a screen for setting a common setting item that is to be set to common content in the plurality of image forming apparatuses, and the individual setting screen being a screen for setting an individual setting item that is to be set to individual content in each of the plurality of image forming apparatuses. When the common setting screen is determined to be displayed next, the parent apparatus transmits a setting screen that is a screen for setting the common setting item and that is stored in the parent apparatus, as the common setting screen to the mobile terminal. When the individual setting screen is determined to be displayed next, the parent apparatus generates a new screen that is a screen for setting the individual setting item and that is based on a setting screen stored in the parent apparatus, and transmits the new screen as the individual setting screen to the mobile terminal.

(17) In the image forming system of (16), the parent apparatus further includes a setting unit that performs setting processing on the own apparatus, and the determination unit determines whether the operation screen that is currently being displayed is a common setting screen or an individual setting screen. When the operation screen is determined as the common setting screen, the setting unit sets setting content that is based on the first setting information in the parent apparatus, the second communication unit transmits the second setting information to the setting target child apparatus, and the setting target child apparatus sets the common setting item to the same content as the setting content set in the parent apparatus, on the basis of the second setting information received from the parent apparatus. When the operation screen is determined as the individual setting screen, the second communication unit transmits the second setting information to the setting target child apparatus, and the setting target child apparatus sets the individual setting item to setting content that is based on the second setting information received from the parent apparatus.

(18) In the image forming system of one of (1) to (17), the mobile terminal further includes a parent-apparatus determination unit that determines the parent apparatus from among the plurality of image forming apparatuses on the basis of apparatus information regarding the plurality of image forming apparatuses.

(19) In the image forming system of (18), the parent-apparatus determination unit determines an apparatus with highest hardware performance among the plurality of image forming apparatuses as the parent apparatus.

(20) In the image forming system of (18), the parent-apparatus determination unit determines an apparatus with highest intensity of wireless network communication with a base station of the wireless network communication among the plurality of image forming apparatuses as the parent apparatus.

(21) In the image forming system of one of (18) to (20), the mobile terminal further includes an apparatus-information acquisition unit that establishes individual short-distance wireless communication with each of the plurality of image forming apparatuses and acquires the apparatus information regarding the plurality of image forming apparatuses through the short-distance wireless communication.

(22) In the image forming system of one of (1) to (17), the mobile terminal further includes an apparatus-information acquisition unit that establishes individual short-distance wireless communication with each of the plurality of image forming apparatuses and acquires apparatus information regarding the plurality of image forming apparatuses through the short-distance wireless communication. The first communication unit transmits the apparatus information to the parent apparatus, and the determination unit acquires communication destination information for the child apparatus on the basis of the apparatus information regarding the plurality of image forming apparatuses.

(23) In the image forming system of one of (1) to (17), the parent apparatus further includes a storage unit that stores apparatus information regarding the plurality of image forming apparatuses in advance, and the determination unit acquires communication destination information for the child apparatus on the basis of the apparatus information regarding the plurality of image forming apparatuses.

(24) An image forming apparatus that is one apparatus among a plurality of image forming apparatuses constituting an image forming system, includes a communication unit that establishes communication connection in a remote operation mode with a mobile terminal, the remote operation mode being a mode in which the mobile terminal operates as a remote operation apparatus of a parent apparatus that is the one apparatus among the plurality of image forming apparatuses, and during the communication connection in the remote operation mode, transmits an operation screen to be displayed on the mobile terminal to the mobile terminal and receives first setting information regarding a user operation provided to the operation screen, from the mobile terminal, and a determination unit that determines a setting target child apparatus that is an apparatus other than the parent apparatus among the plurality of image forming apparatuses and that is a child apparatus on which setting processing is to be performed on the basis of information received from the parent apparatus. The communication unit transmits second setting information that is based on the first setting information from the parent apparatus to the setting target child apparatus.

(25) The image forming apparatus of (24) further includes a setting unit that performs setting processing on the own apparatus When a common setting screen is transmitted as the operation screen from the parent apparatus to the mobile terminal, the common setting screen being a screen for setting a common setting item that is to be set to common content in the plurality of image forming apparatuses, the setting unit sets setting content that is based on the first setting information in the parent apparatus, and the communication unit transmits the second setting information to the setting target child apparatus to set the same content as the setting content that is set in the parent apparatus.

(26) In the image forming apparatus of (25), the communication unit transmits a screen for setting the common setting item, stored in the parent apparatus, as the common setting screen to the mobile terminal.

(27) In the image forming apparatus of (24), when an individual setting screen is transmitted as the operation screen from the parent apparatus to the mobile terminal, the individual setting screen being a screen for setting an individual setting item that is to be set to individual content in each of the plurality of image forming apparatuses, the communication unit transmits the second setting information to the setting target child apparatus to set an inherent value in the setting target child apparatus.

(28) The image forming apparatus of (27) further includes a generation unit that generates a plurality of images, the number of which corresponds to the number of the plurality of image forming apparatuses, by copying a setting screen for the parent apparatus to set the individual setting item, and generates the individual setting screen by arranging and combining the plurality of images in a predetermined direction.

(29) In the image forming apparatus of (28), the communication unit receives position information regarding a user operation provided to the individual setting screen from the mobile terminal, and the determination unit determines the setting target child apparatus from among the plurality of image forming apparatuses on the basis of the position information.

(30) The image forming apparatus of (27) further includes a generation unit that generates the individual setting screen in which input fields for the individual setting item are arrayed, the number of the input fields corresponding to the number of the plurality of image forming apparatuses

(31) The image forming apparatus of (27) further includes a generation unit that generates the individual setting screen by combining a parent-apparatus setting screen and a plurality of tab images, the parent-apparatus setting screen being a setting screen for and stored in the parent apparatus and being a screen for setting the individual setting item.

(32) The image forming apparatus of (27) further includes a generation unit that generates the individual setting screen by combining a child-apparatus setting screen and a plurality of tab images, the child-apparatus setting screen being a setting screen for and stored in the setting target child apparatus and being a screen for setting the individual setting item.

(33) In the image forming apparatus of (32), the communication unit transmits to the setting target child apparatus a request to transmit the child-apparatus setting screen and receives the child-apparatus setting screen from the setting target child apparatus, and the generation unit generates a composite image of the child-apparatus setting screen and the plurality of tab images as the individual setting screen.

(34) In the image forming apparatus of one of (31) to (33), the communication unit receives position information that includes an operational position in the plurality of tab images from the mobile terminal, and the determination unit determines the setting target child apparatus from among the plurality of image forming apparatuses on the basis of the position information.

(35) The image forming apparatus of one of (24) to (34) further includes a storage unit that stores apparatus information regarding the plurality of image forming apparatuses in advance. The determination unit acquires communication destination information for the child apparatus on the basis of the apparatus information regarding the plurality of image forming apparatuses.

(36) The image forming apparatus of (24) further includes a determination unit that determines whether the operation screen to be displayed next is a common setting screen or an individual setting screen, the common setting screen being a screen for setting a common setting item that is to be set to common content in the plurality of image forming apparatuses, and the individual setting screen being a screen for setting an individual setting item that is to be set to individual content in each of the plurality of image forming apparatuses. When the common setting screen is determined to be displayed next, the parent apparatus transmits a setting screen that is a screen for setting the common setting item and that is stored in the parent apparatus, as the common setting screen to the mobile terminal. When the individual setting screen is determined to be displayed next, the parent apparatus generates a new screen that is a screen for setting the individual setting item and that is based on a setting screen stored in the parent apparatus, and transmits the new screen as the individual setting screen to the mobile terminal.

(37) The image forming apparatus of (36) further includes a setting unit that performs setting processing on the own apparatus, and the determination unit determines whether the operation screen that is currently being displayed is a common setting screen or an individual setting screen. When the operation screen is determined as the common setting screen, the setting unit sets setting content that is based on the first setting information in the parent apparatus, and the communication unit transmits the second setting information to the setting target child apparatus to set the same content as the setting content set in the parent apparatus in the setting target child apparatus. When the operation screen is determined as the individual setting screen, the communication unit transmits the second setting information to the setting target child apparatus.

(38) A program for causing a computer built into a mobile terminal to execute the steps of a) determining a parent apparatus from among a plurality of image forming apparatuses that constitute an image forming system, on the basis of apparatus information regarding the plurality of image forming apparatuses, b) establishing communication connection in a remote operation mode between the mobile terminal and the parent apparatus, the remote operation mode being a mode in which the mobile terminal operates as a remote operation apparatus of the parent apparatus, c) during the communication connection in the remote operation mode, displaying an operation screen that is received from the parent apparatus and that is a screen for performing setting processing on the plurality of image forming apparatuses, and accepts a user operation provided to the operation screen, and d) transmitting first setting information that is based on the user operation to the parent apparatus

(39) In the program of (38), the operation screen displayed in the step c) is a common setting screen that is a screen for setting a common setting item that is to be set to common content in the plurality of image forming apparatuses.

(40) In the program of (38), the operation screen displayed in the step c) is an individual setting screen that is a screen for setting an individual setting item that is to be set to individual content in each of the plurality of image forming apparatuses.

(41) In the program of (40), the step c) includes the steps of c-1) displaying a partial range of the individual setting screen received as the operation screen at an increased size on a display unit of the mobile terminal, and c-2) changing the partial range on the basis of a relationship between a direction of the line of sight of an operator of the mobile terminal and directions of the plurality of image forming apparatuses as viewed from a current location of the mobile terminal

(42) In the program of (40), the step c) includes the steps of c-1) identifying a setting target apparatus from among the plurality of image forming apparatuses on the basis of a relationship between a direction of the line of sight of an operator of the mobile terminal and directions of the plurality of image forming apparatuses as viewed from a current location of the mobile terminal, c-2) transmitting information regarding the setting target apparatus that has been identified, to the parent apparatus, c-3) receiving the individual setting screen generated for the setting target apparatus by the parent apparatus from the parent apparatus, and c-4) displaying the individual setting screen received in the step c-3) as the operation screen on the mobile terminal

(43) The program of (41) or (42) causes the computer to further execute the step e) of, prior to the step a), establishing individual short-distance wireless communication with each of the plurality of image forming apparatuses and acquiring apparatus information regarding the plurality of image forming apparatuses through the short-distance wireless communication. In the step e), when the individual short-distance wireless communication between the mobile terminal held by the user and each of the plurality of image forming apparatuses is sequentially established along with travel of a user, a relative positional relationship of the plurality of image forming apparatuses is acquired by detecting a distance and direction of travel of the user between the plurality of image forming apparatuses with a sensor, and a relative positional relationship between the current operational position and the position of each of the plurality of image forming apparatuses is acquired by detecting, with a sensor, a distance and direction of travel of the user when moving from an installation location of one of the plurality of image forming apparatuses to the current operational position of the mobile terminal.

(44) The program of one of (38) to (42) causes the computer to further execute the step e) of, prior to the step a), establishing individual short-distance wireless communication with each of the plurality of image forming apparatuses and acquiring apparatus information regarding the plurality of image forming apparatuses through the short-distance wireless communication.

(45) In the program of one of (38) to (44), an apparatus with highest hardware performance among the plurality of image forming apparatuses is determined as the parent apparatus in the step a).

(46) In the program of one of (38) to (44), an apparatus with highest intensity of wireless network communication with a base station of the wireless network communication among the plurality of image forming apparatuses is determined as the parent apparatus in the step a).

The present invention may be embodied in various other forms without departing from the spirit or essential characteristics thereof. The embodiments disclosed in this application are to be considered in all respects as illustrative and not limiting. The scope of the invention is indicated by the appended claims rather than by the foregoing description, and all modifications or changes that come within the meaning and range of equivalency of the claims are intended to be embraced therein.

What is claimed is:

1. An image forming system comprising:
a plurality of image forming apparatuses; and
a mobile terminal,
wherein the mobile terminal includes:
a first communication unit that establishes communication connection in a remote operation mode with a parent apparatus that is one of the plurality of image forming apparatuses, the remote operation mode being a mode in which the mobile terminal operates as a remote operation apparatus of the parent apparatus; and
an operation unit that, during the communication connection in the remote operation mode, displays an operation screen received from the parent apparatus and accepts a user operation provided to the operation screen,
the first communication unit transmits first setting information that is based on the user operation to the parent apparatus, wherein the first setting information includes at least one of touch coordinates of the operation screen and a setting input value,
the parent apparatus includes:
a second communication unit that receives the first setting information from the mobile terminal; and
a hardware processor that is configured to determine a setting target child apparatus from among the plurality of image forming apparatuses, the setting target child apparatus being an apparatus other than the parent apparatus and being a child apparatus on which setting processing is to be performed on a basis of information received from the parent apparatus,
the second communication unit transmits second setting information that is based on the first setting information from the parent apparatus to the setting target child apparatus, wherein the second setting information includes at least one of the touch coordinates and an item ID of a setting item,
the setting target child apparatus sets setting content that is based on the second setting information received from the parent apparatus in the setting target child apparatus, and
wherein the mobile terminal acquires apparatus information regarding the plurality of image forming apparatuses via contact with a NFC (near-field communication) touch unit of each of the plurality image forming apparatuses.

2. The image forming system according to claim 1, wherein
the hardware processor is further configured to perform setting processing on the own apparatus, and
when a common setting screen is transmitted as the operation screen from the parent apparatus to the mobile terminal, the common setting screen being a screen for setting a common setting item that is to be set to common content in the plurality of image forming apparatuses,
the hardware processor is further configured to set setting content that is based on the first setting information in the parent apparatus,
the second communication unit transmits the second setting information to the setting target child apparatus, and
the setting target child apparatus sets the common setting item to the same content as the setting content set in the parent apparatus, on a basis of the second setting information received from the parent apparatus.

3. The image forming system according to claim 1, wherein
when an individual setting screen is transmitted as the operation screen from the parent apparatus to the mobile terminal, the individual setting screen being a screen for setting an individual setting item that is to be set to individual content in each of the plurality of image forming apparatuses,
the second communication unit transmits the second setting information to the setting target child apparatus, and
the setting target child apparatus sets the individual setting item to setting content that is based on the second setting information received from the parent apparatus.

4. The image forming system according to claim 1, wherein
the hardware processor is further configured to determine whether the operation screen to be displayed next is a common setting screen or an individual setting screen,
the common setting screen being a screen for setting a common setting item that is to be set to common content in the plurality of image forming apparatuses, and
the individual setting screen being a screen for setting an individual setting item that is to be set to individual content in each of the plurality of image forming apparatuses,
when the common setting screen is determined to be displayed next,
the parent apparatus transmits a setting screen that is a screen for setting the common setting item and that is stored in the parent apparatus, as the common setting screen to the mobile terminal, and
when the individual setting screen is determined to be displayed next,
the parent apparatus generates a new screen that is a screen for setting the individual setting item and that is based on a setting screen stored in the parent apparatus, and transmits the new screen as the individual setting screen to the mobile terminal.

5. The image forming system according to claim 1, wherein
the mobile terminal further includes:
a second hardware processor configured to determine the parent apparatus from among the plurality of image forming apparatuses on a basis of the apparatus information regarding the plurality of image forming apparatuses.

6. The image forming system according to claim 1, wherein
the mobile terminal further includes:
an apparatus-information acquisition unit that establishes individual short-distance wireless communication with each of the plurality of image forming apparatuses and the apparatus information regarding the plurality of image forming apparatuses through the short-distance wireless communication,
the first communication unit transmits the apparatus information to the parent apparatus, and
the second hardware processor is further configured to acquire communication destination information for the child apparatus on a basis of the apparatus information regarding the plurality of image forming apparatuses.

7. The image forming system according to claim 1, wherein
the parent apparatus further includes:
a storage that stores the apparatus information regarding the plurality of image forming apparatuses in advance, and
the hardware processor is further configured to acquire communication destination information for the child apparatus on a basis of the apparatus information regarding the plurality of image forming apparatuses.

8. The image forming system according to claim 1, wherein the first setting information includes at least one of the touch coordinates of the operation screen.

9. The image forming system according to claim 1, wherein the parent apparatus is determined based on the image forming apparatus having a newest version of firmware among the plurality of image forming apparatuses.

10. An image forming apparatus that is one apparatus among a plurality of image forming apparatuses constituting an image forming system, the image forming apparatus comprising:
a communication unit that establishes communication connection in a remote operation mode with a mobile terminal, the remote operation mode being a mode in which the mobile terminal operates as a remote operation apparatus of a parent apparatus that is the one apparatus among the plurality of image forming apparatuses, and during the communication connection in the remote operation mode, transmits an operation screen to be displayed on the mobile terminal to the mobile terminal and receives first setting information regarding a user operation provided to the operation screen from the mobile terminal, wherein the first setting information includes at least one of touch coordinates of the operation screen and a setting input value; and
a hardware processor that is configured to determine a setting target child apparatus that is an apparatus other than the parent apparatus among the plurality of image forming apparatuses and that is a child apparatus on which setting processing is to be performed on the basis of information received from the parent apparatus,
wherein the communication unit transmits second setting information that is based on the first setting information from the parent apparatus to the setting target child apparatus, wherein the second setting information includes at least one of the touch coordinates and an item ID of a setting item, and wherein the mobile terminal acquires apparatus information regarding the plurality of image forming apparatuses via contact with a NFC (near-field communication) touch unit of each of the plurality image forming apparatuses.

11. The image forming apparatus according to claim 10, wherein the hardware processor is further configured to perform setting processing on the own apparatus, wherein, when a common setting screen is transmitted as the operation screen from the parent apparatus to the mobile terminal, the common setting screen being a screen for setting a common setting item that is to be set to common content in the plurality of image forming apparatuses, the hardware processor is further configured to set setting content that is based on the first setting information in the parent apparatus, and the communication unit transmits the second setting information to the setting target child apparatus to set the same content as the setting content that is set in the parent apparatus.

12. The image forming apparatus according to claim 10, wherein when an individual setting screen is transmitted as the operation screen from the parent apparatus to the mobile terminal, the individual setting screen being a screen for setting an individual setting item that is to be set to individual content in each of the plurality of image forming apparatuses, the communication unit transmits the second setting information to the setting target child apparatus to set an inherent value in the setting target child apparatus.

13. The image forming apparatus according to claim 10, further comprising:

a storage that stores the apparatus information regarding the plurality of image forming apparatuses in advance, and wherein the hardware processor is further configured to acquire communication destination information for the child apparatus on a basis of the apparatus information regarding the plurality of image forming apparatuses.

14. The image forming apparatus according to claim 10, wherein the hardware processor is further configured to determine whether the operation screen to be displayed next is a common setting screen or an individual setting screen, the common setting screen being a screen for setting a common setting item that is to be set to common content in the plurality of image forming apparatuses, and the individual setting screen being a screen for setting an individual setting item that is to be set to individual content in each of the plurality of image forming apparatuses, wherein, when the common setting screen is determined to be displayed next, the parent apparatus transmits a setting screen that is a screen for setting the common setting item and that is stored in the parent apparatus, as the common setting screen to the mobile terminal, and when the individual setting screen is determined to be displayed next, the parent apparatus generates a new screen that is a screen for setting the individual setting item and that is based on a setting screen stored in the parent apparatus, and transmits the new screen as the individual setting screen to the mobile terminal.

15. A non-transitory computer-readable recording medium that records a program for causing a computer built into a mobile terminal to execute the steps of:

a) determining a parent apparatus from among a plurality of image forming apparatuses that constitute an image forming system, on a basis of apparatus information regarding the plurality of image forming apparatuses;

b) establishing communication connection in a remote operation mode between the mobile terminal and the parent apparatus, the remote operation mode being a mode in which the mobile terminal operates as a remote operation apparatus of the parent apparatus;

c) during the communication connection in the remote operation mode, displaying an operation screen that is received from the parent apparatus and that is a screen for performing setting processing on the plurality of image forming apparatuses, and accepts a user operation provided to the operation screen; and d) transmitting first setting information that is based on the user operation to the parent apparatus, wherein the first setting information includes at least one of touch coordinates of the operation screen and a setting input value, and e) acquiring the apparatus information regarding the plurality of image forming apparatuses via contact with a NFC (near-field communication) touch unit of each of the plurality image forming apparatuses.

16. The recording medium according to claim 15, wherein the operation screen displayed in the step c) is a common setting screen that is a screen for setting a common setting item that is to be set to common content in the plurality of image forming apparatuses.

17. The recording medium according to claim 15, wherein the operation screen displayed in the step c) is an individual setting screen that is a screen for setting an individual setting item that is to be set to individual content in each of the plurality of image forming apparatuses.

18. The recording medium according to claim 15, causing the computer to further execute the step of:

prior to the step a), establishing individual short-distance wireless communication with each of the plurality of image forming apparatuses and acquiring the apparatus information regarding the plurality of image forming apparatuses through the short-distance wireless communication.

19. The recording medium according to claim 15, wherein in the step a), an apparatus with highest hardware performance among the plurality of image forming apparatuses is determined as the parent apparatus.

20. The recording medium according to claim 15, wherein in the step a), an apparatus with highest intensity of wireless network communication with a base station of the wireless network communication among the plurality of image forming apparatuses is determined as the parent apparatus.

* * * * *